US007597619B2

(12) United States Patent
Crivelli et al.

(10) Patent No.: US 7,597,619 B2
(45) Date of Patent: Oct. 6, 2009

(54) GAMING METHOD AND SYSTEM WITH A HIDDEN IMAGE GAME PIECE

(75) Inventors: Franco Crivelli, Reno, NV (US); Craig A. Paulsen, Reno, NV (US)

(73) Assignee: IGT, Reno, NV (US)

( * ) Notice: Subject to any disclaimer, the term of this patent is extended or adjusted under 35 U.S.C. 154(b) by 1000 days.

(21) Appl. No.: 10/895,521

(22) Filed: Jul. 21, 2004

(65) Prior Publication Data

US 2006/0030394 A1 Feb. 9, 2006

(51) Int. Cl.
*A63F 13/00* (2006.01)

(52) U.S. Cl. ............................ 463/20; 463/16; 463/17; 463/18; 463/30

(58) Field of Classification Search .................. 463/20, 463/16, 17, 18, 21, 30
See application file for complete search history.

(56) References Cited

U.S. PATENT DOCUMENTS 4,157,829 A 6/1979 Goldman et al.
4,360,548 A 11/1982 Skees et al. .................. 428/29
4,494,197 A 1/1985 Troy et al.
4,582,324 A 4/1986 Koza et al.
4,652,998 A 3/1987 Koza et al.
4,689,742 A 8/1987 Troy et al.
4,856,787 A 8/1989 Itkis
4,982,337 A 1/1991 Burr et al.
5,042,809 A 8/1991 Richardson
5,092,598 A 3/1992 Kamille
5,100,139 A 3/1992 Di Bella
5,158,293 A 10/1992 Mullins
5,276,312 A 1/1994 McCarthy
5,282,620 A 2/1994 Keesee
5,407,199 A 4/1995 Gumina
5,628,684 A 5/1997 Bouedec
5,944,606 A 8/1999 Gerow (Continued)

FOREIGN PATENT DOCUMENTS

WO WO 00/67424 11/2000

OTHER PUBLICATIONS

Instant Slotto Article written by Strictly Slots, published in Apr. 2001.

(Continued)

*Primary Examiner*—Dmitry Suhol
*Assistant Examiner*—Thomas H Henry
(74) *Attorney, Agent, or Firm*—K&L Gates LLP

(57) ABSTRACT

A gaming method and system includes determining if at least one first trigger event has occurred, dispensing at least one game piece if the at least one trigger event has occurred, the at least one game piece having at least one hidden image and at least one concealing image disposed thereon, the at least one concealing image limiting the visibility of the at least one hidden image, determining if a second trigger event has occurred, receiving at least one identifier associated with the at least one game piece if the second trigger event has occurred, determining a payout according to the at least one identifier, and causing a display unit to generate a reveal pattern, the reveal pattern cooperating with the at least one concealing image of the at least one game piece to make the at least one hidden image visible if the second trigger event has occurred.

44 Claims, 21 Drawing Sheets

U.S. PATENT DOCUMENTS

| | | | | |
|---|---|---|---|---|
| 5,949,042 | A | 9/1999 | Dietz, II et al. | |
| 5,984,367 | A | 11/1999 | Barnhart et al. | 283/92 |
| 5,996,997 | A | 12/1999 | Kamille | |
| 6,210,276 | B1 | 4/2001 | Mullins | |
| 6,220,961 | B1 | 4/2001 | Keane et al. | |
| 6,241,606 | B1 | 6/2001 | Riendeau et al. | |
| 6,250,685 | B1 | 6/2001 | Walker et al. | |
| 6,296,900 | B1 * | 10/2001 | Barnhart et al. | 427/145 |
| 6,309,298 | B1 | 10/2001 | Gerow | |
| 6,368,218 | B2 | 4/2002 | Angell, Jr. | |
| 6,406,062 | B1 | 6/2002 | Brooks et al. | 283/92 |
| 6,599,187 | B2 | 7/2003 | Gerow | 463/17 |
| 6,602,137 | B2 * | 8/2003 | Kaminkow et al. | 463/16 |
| 6,648,755 | B1 | 11/2003 | Luciano, Jr. et al. | 463/17 |
| 6,709,333 | B1 | 3/2004 | Bradford et al. | 463/29 |
| 7,306,520 | B2 | 12/2007 | Kaminkow et al. | |
| 2002/0072404 | A1 | 6/2002 | Gerow | |
| 2002/0082070 | A1 | 6/2002 | Macke et al. | |
| 2002/0098882 | A1 | 7/2002 | Lind et al. | |
| 2002/0098883 | A1 | 7/2002 | Packes, Jr. et al. | |
| 2003/0060256 | A1 | 3/2003 | Joshi | |
| 2003/0193136 | A1 | 10/2003 | Walker et al. | |

OTHER PUBLICATIONS

Instant Winner Advertisement by Williams/WMS Gaming, published prior to 2002.

Lucky Times California Lottery Newsletter published 1996.

Power Slotto Advertisement written by A.C. Coin, published prior to 2004.

* cited by examiner

FIG. 14
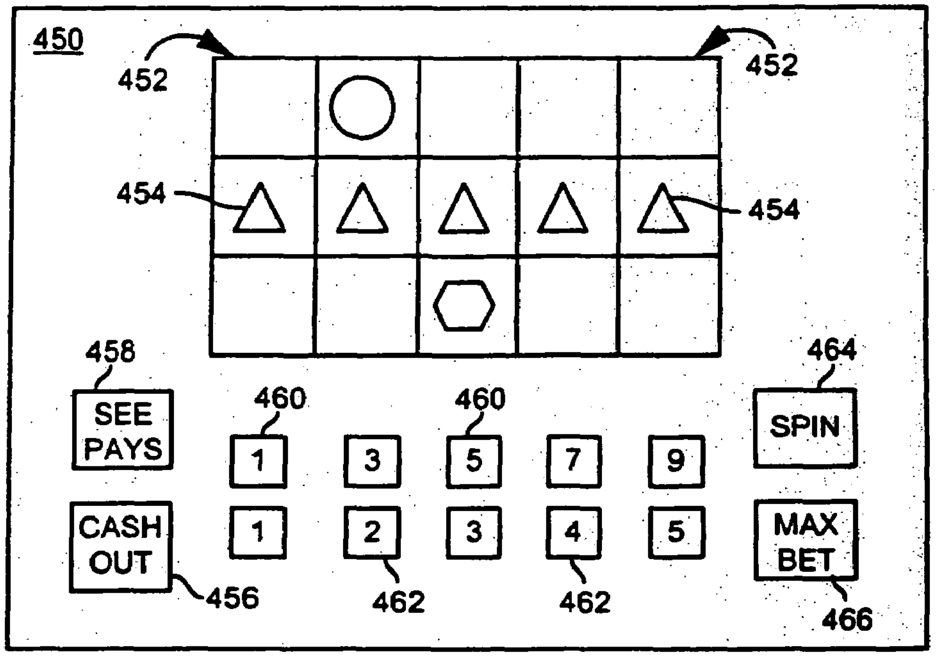
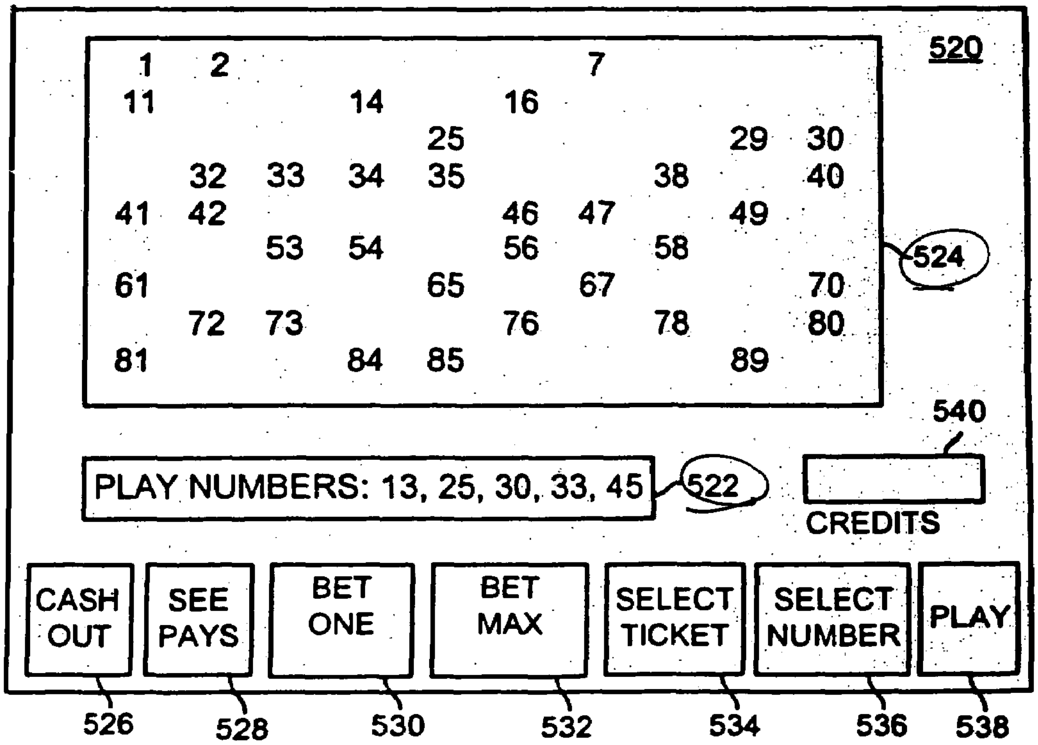
FIG. 15

GAMING METHOD AND SYSTEM WITH A HIDDEN IMAGE GAME PIECE

BACKGROUND

The present disclosure relates to gaming machines and, more particularly, to a gaming apparatus for revealing a hidden image contained in an external game piece for use with the gaming apparatus.

Conventional gaming machines are typically provided with a cabinet and a gaming display mounted inside the cabinet. The gaming display may be mechanical, such as a series of stepper wheels, may be electronic such as a video display that is capable of generating video images, or may be a combination of the two, such as a stepper wheel with an electronic video display attached thereto. Whether mechanical, electronic, or combination, the gaming display of conventional gaming units has generated images associated with a gaming system, such as poker, blackjack, slots, keno, pachinko, or bingo.

While the gaming display is the primary functional component, gaming units typically include additional physical components or game play variations to attract players to the gaming machine and/or enhance game play. Some examples include: attraction sequences, including sensory stimulation (e.g., sight and sound); gaming bonus games; jackpots; player incentives, including player tracking; group bonuses; dynamic symbols; game themes; and the like.

In some gaming machines, images, symbols, bonuses and/or other incentives are hidden from the player, increasing the suspense of play, until the gaming machine reveals them to the player. To hide these objects, gaming machines have utilized a number of different internal techniques including mechanical masks, such as mechanical doors that open to reveal a display, electronic masks, such as light curtains or electroluminescent displays, and image manipulations, such as showing the back side of an video card image. While each of these techniques may add to the player's enjoyment, there is a continuing desire to involve the game player in the game play experience.

SUMMARY OF THE INVENTION

According to an aspect of the present disclosure, a gaming method for a gaming system includes receiving a wager, causing a display unit to generate an image representative of a game, determining an outcome of the game represented by the image, and determining a payout according to the outcome of the game and the wager received. The method also includes determining if at least one first trigger event has occurred, dispensing at least one game piece if the at least one first trigger event has occurred, the at least one game piece having at least one hidden image and at least one concealing image disposed thereon, the at least one concealing image limiting the visibility of the at least one hidden image. The method further includes determining if a second trigger event has occurred, receiving at least one identifier associated with the at least one game piece if the second trigger event has occurred, determining a payout according to the at least one identifier, and causing a display unit to generate a reveal pattern, the reveal pattern cooperating with the at least one concealing image of the at least one game piece to make the at least one hidden image visible if the second trigger event has occurred.

According to another aspect of the disclosure, a gaming system includes one or more display units, a game piece dispenser capable of dispensing a game piece having at least one hidden image and at least one concealing image disposed thereon, the at least one concealing image limiting visibility of the at least one hidden image, an identification input device, and a controller operatively coupled to the one of the one or more display units, the game piece dispenser, and the identification input device. The controller is programmed to receive a wager, to cause one of one or more display units to generate an image representative of a game, to determine an outcome of the game represented by the image, and to determine a payout according to the outcome of the game and the wager received. The controller is also programmed to determine if at least one first trigger event has occurred, and to cause the game piece dispenser to dispense at least one game piece if the at least one first trigger event has occurred. The controller is further programmed to determine if a second trigger event has occurred, to receive at least one identifier associated with at least one game piece via the identification input device if the second trigger event has occurred, to determine a payout according to the at least one identifier, and to cause one of one or more display units to generate a reveal pattern, the reveal pattern cooperating with at least one concealing image of the at least one game piece to make at least one hidden image visible if the second trigger event has occurred.

Additional aspects of the invention are defined by the claims of this patent.

BRIEF DESCRIPTION OF THE DRAWINGS

FIG. 14 is an illustration of an embodiment of a visual display that may be displayed during performance of the slots routine of FIG. 16;

FIG. 15 is an illustration of an embodiment of a visual display that may be displayed during performance of the video keno routine of FIG. 17;

DETAILED DESCRIPTION OF VARIOUS EMBODIMENTS

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Gaming System

Figure 1:
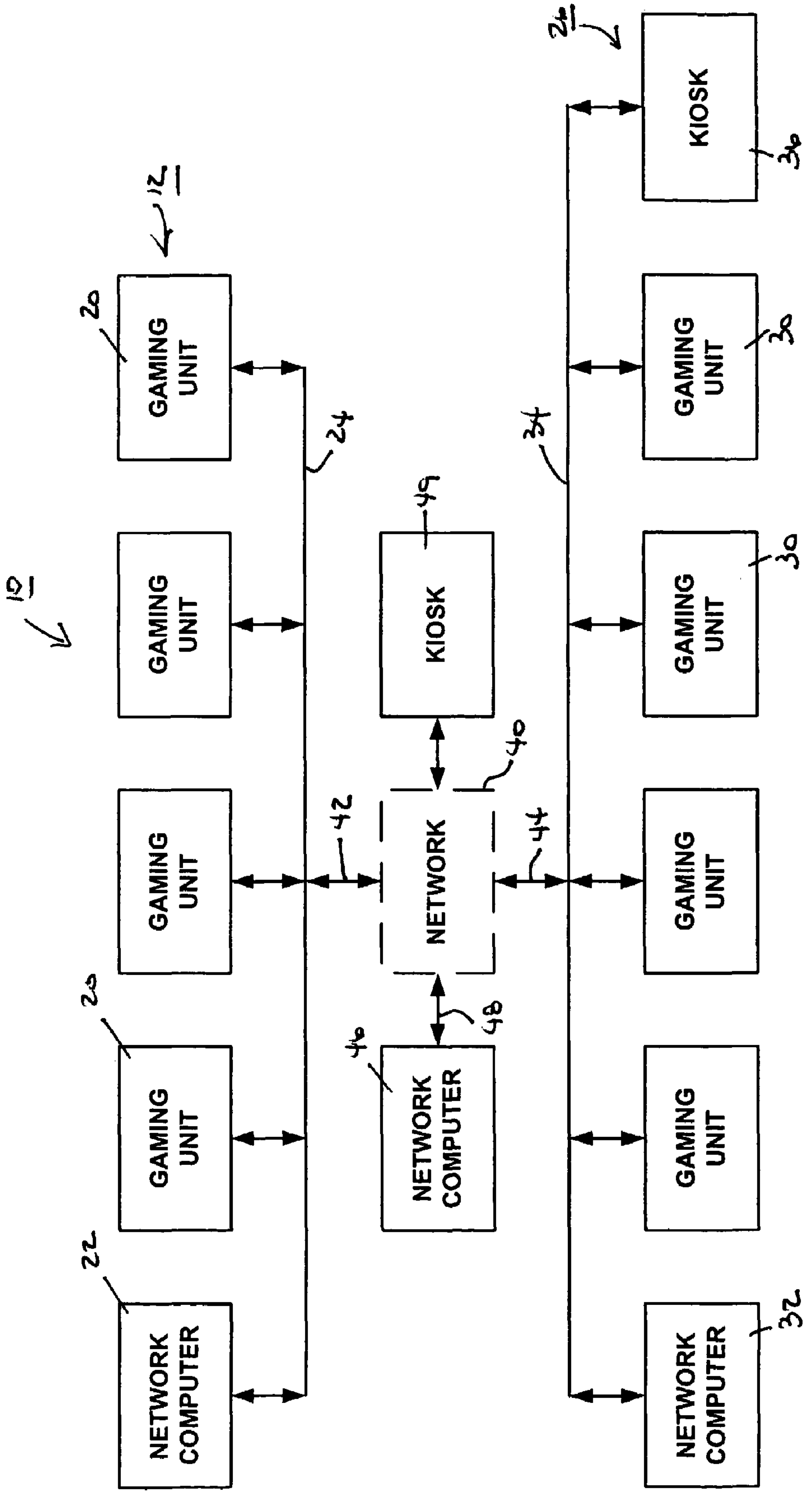
FIG. 1 is a block diagram of an embodiment of a gaming system.

FIG. 1 illustrates one possible embodiment of a gaming system 10. Referring to FIG. 1, the gaming system 10 may include a first group or network 12 of gaming units 20 operatively coupled to a network computer 22 via a network data link or bus 24. The gaming system 10 may include a second group or network 26 of gaming units 30 operatively coupled to a network computer 32 via a network data link or bus 34. The first and second gaming networks 12, 26 may be operatively coupled to each other via a network 40, which may comprise, for example, the Internet, a wide area network (WAN), or a local area network (LAN) via a first network link 42 and a second network link 44. The networks 12, 26 may also be connected, via the network 40, to network computer 46 via a third network link 48.

The first network 12 of gaming units 20 may be provided in a first casino, and the second network 26 of gaming units 30 may be provided in a second casino located in a separate geographic location than the first casino. For example, the two casinos may be located in different areas of the same city, or they may be located in different states. The network 40 may include a plurality of network computers or server computers (not shown), each of which may be operatively interconnected. Where the network 40 comprises the Internet, data communication may take place over the communication links 42, 44, 48 via an Internet communication protocol.

The network computer 22 may be a server computer and may be used to accumulate and analyze data relating to the operation of the gaming units 20. For example, the network computer 22 may continuously receive data from each of the gaming units 20 indicative of the dollar amount and number of wagers being made on each of the gaming units 20, data indicative of how much each of the gaming units 20 is paying out in winnings, data regarding the identity and gaming habits of players playing each of the gaming units 20, etc. The network computer 32 may be a server computer and may be used to perform the same or different functions in relation to the gaming units 30 as the network computer 22 described above.

Although each network 12, 26 is shown to include one network computer 22, 32 and four gaming units 20, 30 and a data link 24, 34, it should be understood that different numbers of computers and gaming units may be utilized. For example, the network 12 may include a plurality of network computers 22 and tens or hundreds of gaming units 20, all of which may be interconnected via the data link 24. Further, the data links 24, 34 may be provided as a dedicated hardwired link or a wireless link, such as an infrared link or a radio frequency link. Although the data link 24, 34 is shown as a single data link, the data link 24, 34 may comprise multiple data links.

The network computer 46 may also be a server computer and may be used to accumulate and analyze data relating to the operation of the gaming units 20, 30. For example, the network computer 46 may continuously receive data from each of the gaming units 20, 30 indicative of the dollar amount and number of wagers being made on each of the gaming units 20, 30, data indicative of how much each of the gaming units 20, 30 is paying out in winnings, data regarding the identity and gaming habits of players playing each of the gaming units 20, 30, etc. The network computer 46 may use this data as part of an accounting, a bonusing and/or a player tracking system.

As a further alternative, and in particular to the disclosure of this application, the network computer 46 may be a game piece server. That is, the network computer 46 may be in communication with one or more of the gaming units 20, 30, and may, for example, determine which gaming units 20, 30 should dispense a game piece to the player at that gaming unit, determine which game pieces should be selected as winning game pieces, determine the payout associated with winning game pieces, and/or coordinate the redemption of one or all winning game pieces.

Additionally, while a single network computer 46 is illustrated, it should be understood that more than one network computer 46 may be used, e.g., one for accounting, one for bonusing, one for player tracking, and one as the game piece server. Further, the data link 48 may provided as a dedicated hardwired link or a wireless link, such as an infrared link or a radio frequency link. Although the data link 48 is shown as a single data link, the data link 48 may comprise multiple data links, especially where there is more than one network computer 46.

As another alternative, a peer-to-peer network architecture may be used. In this case, it may be possible to remove one or more of the network computers 22, 32, 46 because the gaming units 20, 30 would instead share the processing handled by the network computers 22, 32, 46 in the gaming system 10 as illustrated.

Gaming Unit

Figure 2:
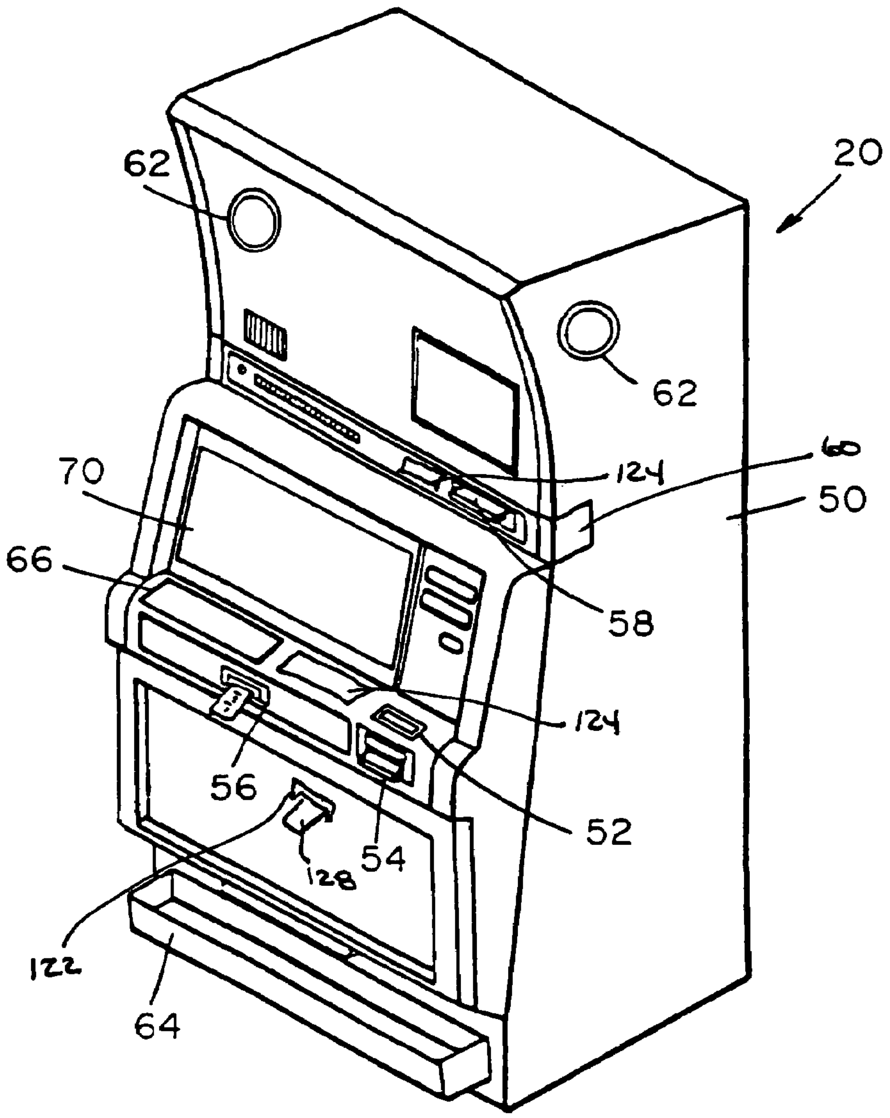
FIG. 2 is a perspective view of an embodiment of one of the gaming units shown schematically in FIG. 1.

FIG. 2 is a perspective view of one possible embodiment of one or more of the gaming units 20. Although the following description addresses the design of the gaming units 20, it should be understood that the gaming units 30 may have the same design as the gaming units 20 described below. It should be understood that the design of one or more of the gaming units 20 may be different than the design of other gaming units 20, and that the design of one or more of the gaming units 30 may be different than the design of other gaming units 30. Each gaming unit 20 may be any type of gaming unit and may have various different structures and methods of operation. For exemplary purposes, various designs of the gaming units 20 are described below, but it should be understood that numerous other designs may be utilized.

Referring to FIG. 2, the gaming unit 20 may include a housing or cabinet 50 and one or more value input devices, which may include a coin slot or acceptor 52, a paper currency acceptor 54, a ticket reader/printer 56 and a card reader 58, which may be used to input value to the gaming unit 20. A value input device may include any device that can accept value from a customer. As used herein, the term "value" may encompass gaming tokens, coins, paper currency, ticket vouchers, credit or debit cards, smart cards, and any other object representative of value.

If provided on the gaming unit 20, the ticket reader/printer 56 may be used to read and/or print or otherwise encode ticket vouchers. The ticket vouchers may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers could be printed with an optically readable material such as ink, or data on the ticket vouchers could be magnetically encoded. The ticket reader/printer 56 may be provided with the ability to both read and print ticket vouchers, or it may be provided with the ability to only read or only print or encode ticket vouchers. In the latter case, for example, some of the gaming units 20 may have ticket printers 56 that may be used to print ticket vouchers, which could then be used by a player in other gaming units 20 that have ticket readers 56.

If provided, the card reader 58 may include any type of card reading device, such as a magnetic card reader or an optical card reader, and may be used to read data from a card offered by a player, such as a credit card or a player tracking card. In fact, as illustrated, the card reader 58 may be part of a player tracking module 60 that is attached to or mounted in the housing 50, and that communicates with the network computer 46, where the network computer 46 is configured to perform player tracking operations. If provided for player tracking purposes, the card reader 58 may be used to read data from, and/or write data to, player tracking cards that are capable of storing data representing the identity of a player, the identity of a casino, the player's gaming habits, etc.

The gaming unit 20 may also include one or more audio speakers 62, a coin payout tray 64, an input control panel 66 and, a display unit 70 for displaying images relating to the game or games provided by the gaming unit 20 as described below. The audio speakers 62 may generate audio representing sounds such as the noise of spinning slot machine reels, a dealer's voice, music, announcements or any other audio related to a casino game. The input control panel 66 may be provided with a plurality of pushbuttons or touch-sensitive areas that may be pressed by a player to select games, make wagers, make gaming decisions, etc. The display unit 70, may be any known video monitor, television screen, dot matrix display, CRT, LED, LCD, physical display, such as traditional slot-machine reels, or electro-luminescent display.

Figure 2A:
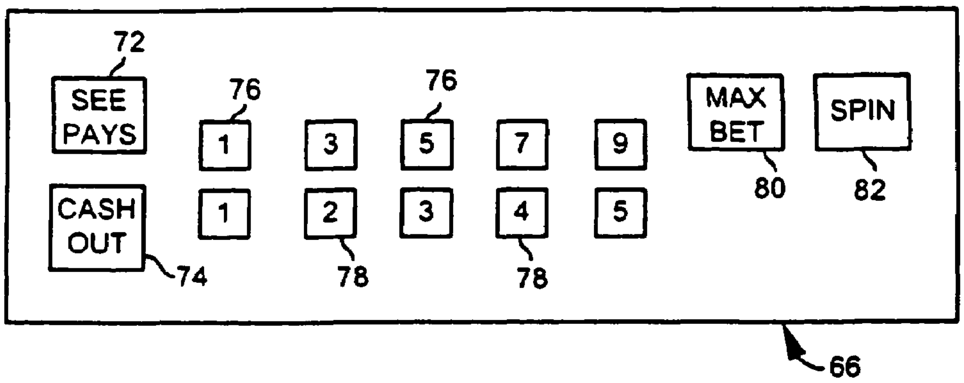
FIG. 2A illustrates an embodiment of a control panel for the gaming unit of FIG. 2.

FIG. 2A illustrates one possible embodiment of the control panel 66, which may be used where the gaming unit 20 is a slot machine having a plurality of mechanical or "virtual" reels. Referring to FIG. 2A, the control panel 66 may include a "See Pays" button 72 that, when activated, causes the display unit 70 to generate one or more display screens showing the odds or payout information for the game or games provided by the gaming unit 20. As used herein, the term "button" is intended to encompass any device that allows a player to make an input, such as an input device that must be depressed to make an input selection or a display area that a player may simply touch. The control panel 66 may include a "Cash Out" button 74 that may be activated when a player decides to terminate play on the gaming unit 20, in which case the gaming unit 20 may return value to the player, such as by returning a number of coins to the player via the payout tray 64.

If the gaming unit 20 provides a slots game having a plurality of reels and a plurality of paylines which define winning combinations of reel symbols, the control panel 66 may be provided with a plurality of selection buttons 76, each of which allows the player to select a different number of paylines prior to spinning the reels. For example, five buttons 76 may be provided, each of which may allow a player to select one, three, five, seven or nine paylines. The selection of buttons 76 may cause one of more paylines to be displayed on the display unit 70.

If the gaming unit 20 provides a slots game having a plurality of reels, the control panel 66 may be provided with a plurality of selection buttons 78 each of which allows a player to specify a wager amount for each payline selected. For example, if the smallest wager accepted by the gaming unit 20 is a quarter ($0.25), the gaming unit 20 may be provided with five selection buttons 78, each of which may allow a player to select one, two, three, four or five quarters to wager for each payline selected. In that case, if a player were to activate the "5" button 76 (meaning that five paylines were to be played on the next spin of the reels) and then activate the "3" button 78 (meaning that three coins per payline were to be wagered), the total wager would be $3.75 (assuming the minimum bet was $0.25).

The control panel 66 may include a "Max Bet" button 80 to allow a player to make the maximum wager allowable for a game. In the above example, where up to nine paylines were provided and up to five quarters could be wagered for each payline selected, the maximum wager would be 45 quarters, or $11.25. The control panel 66 may include a spin button 82 to allow the player to initiate spinning of the reels of a slots game after a wager has been made.

In FIG. 2A, a rectangle is shown around the buttons 72, 74, 76, 78, 80, 82. It should be understood that rectangle simply designates, for ease of reference, an area in which the buttons 72, 74, 76, 78, 80, 82 may be located. Consequently, the term "control panel" should not be construed to imply that a panel or plate separate from the housing 50 of the gaming unit 20 is required, and the term "control panel" may encompass a plurality or grouping of player activatable buttons.

Although one possible control panel 66 is described above, it should be understood that different buttons could be utilized in the control panel 66, and that the particular buttons used may depend on the game or games that could be played on the gaming unit 20. Although the control panel 66 is shown to be separate from the display unit 70, it should be understood that the control panel 66 could be generated by the display unit 70. In that case, each of the buttons of the control panel 66 could be a colored area generated by the display unit 70, and some type of mechanism may be associated with the display unit 70 to detect when each of the buttons was touched, such as a touch-sensitive screen.

Furthermore, although one possible display unit 70 is described above, it should be understood that different embodiments could be utilized in the display unit 70. For example, the display unit 70 may be a plurality of physical reels controlled by stepper motors as commonly known in the art. In that case, a player initiates spinning of the reels through any number of means, including pushing the spin button 82. The physical reel may then be rotated and observed by the player. The spinning reel may then be stopped and the outcome of the game determined.

Gaming Unit Electronics

Figure 3:
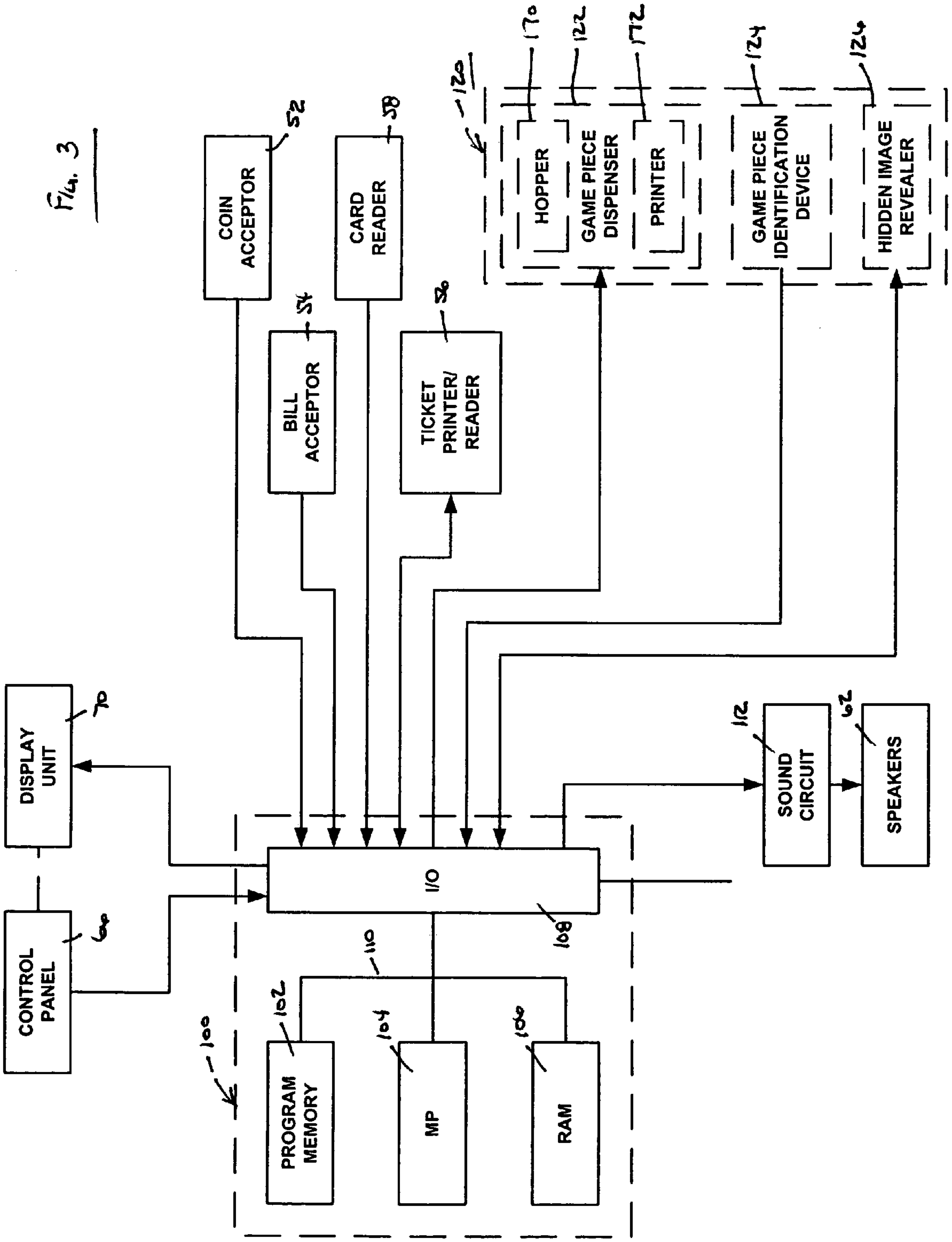
FIG. 3 is a block diagram of an embodiment of the electronic components of the gaming unit of FIG. 2.

FIG. 3 is a block diagram of a number of components that may be incorporated in the gaming unit 20. Referring to FIG. 3, the gaming unit 20 may include a controller 100 that may comprise a program memory 102, a microcontroller or microprocessor (MP) 104, a random-access memory (RAM) 106 and an input/output (I/O) circuit 108, all of which may be interconnected via an address/data bus 110. It should be appreciated that although only one microprocessor 104 is shown, the controller 100 may include multiple microprocessors 104. Similarly, the memory of the controller 100 may include multiple RAMs 106 and multiple program memories 102. Although the I/O circuit 108 is shown as a single block, it should be appreciated that the I/O circuit 108 may include a number of different types of I/O circuits. The RAM(s) 104 and program memories 102 may be implemented as semiconductor memories, magnetically readable memories, and/or optically readable memories, for example.

Although the program memory 102 in FIG. 3 may be read-only memory (ROM), the program memory of the controller 100 may also be a read/write or alterable memory, such as a hard disk. In the event a hard disk is used as a program memory, the address/data bus 110 shown schematically in FIG. 3 may comprise multiple address/data buses, which may be of different types, and there may be an I/O circuit disposed between the address/data buses.

FIG. 3 illustrates that the coin acceptor 52, the bill acceptor 54, the ticket printer 56, the card reader 58, the control panel 66, and the display unit 70 may be operatively coupled to the I/O circuit 108, each of those components being so coupled by either a unidirectional or bidirectional, single-line or multiple-line data link, which may depend on the design of the component that is used. The speaker(s) 62 may be operatively coupled to a sound circuit 112, that may comprise a voice- and sound-synthesis circuit or that may comprise a driver circuit. The sound-generating circuit 112 may be coupled to the I/O circuit 108.

As shown in FIG. 3, the components 52, 54, 56, 58, 66, 70, 112 may be connected to the I/O circuit 108 via a respective direct line or conductor. Different connection schemes could be used. For example, one or more of the components shown in FIG. 3 may be connected to the I/O circuit 108 via a common bus or other data link that is shared by a number of components. Furthermore, some of the components may be directly connected to the microprocessor 104 without passing through the I/O circuit 108.

Hidden Image Game System and Game Pieces

In addition to the foregoing, the gaming unit 20, 30 may also include one or more devices that are part of a game system 120 (see FIG. 3) that may be separate from or integrated with the gaming system 10. That is, the game system 120 may include one or more devices that may include or utilize one or more of the components 52, 54, 56, 58, 66, 70, 100, 102, 104, 106 already discussed as being part of the gaming unit 20, that may be different from the components 52, 54, 56, 58, 66, 70, 100, 102, 104, 106 and may be mounted or disposed within the gaming unit housing 50, or that may be different from the components 52, 54, 56, 58, 66, 70, 100, 102, 104, 106 and may be mounted or disposed in a peripheral housing that may be attached to or disposed on the housing 50. As a further alternative, one or more of the devices of the game system 120 may be associated with the gaming units 20, 30, while other devices may be mounted or disposed in other units, such as kiosks 36, 49 illustrated in FIG. 1. Moreover, the operation of the game system 120 may occur independent of the operation of the gaming system 10, or the operation of the game system 120 may be responsive to events occurring during the operation of the gaming system 10 and/or the operation of the gaming system 10 may be responsive to events occurring during the operation of the game system 120.

As indicated in FIG. 3, the game system 120 may include a game piece dispenser 122, a game piece identification device 124, and a hidden image revealer 126. However, as will be recognized, it is not necessary that all of these elements be present to perform the method of the present disclosure. For example, certain embodiments discussed below do not require the hidden image revealer 126. Additionally, according to other embodiments, the game system 120 may include other devices as well. The game piece dispenser 122, game piece identification device 124 and hidden image revealer 126 are operatively coupled to the controller 100, via the input/output circuit 108, according to the instant embodiment.

The game piece dispenser 120 may be used to provide a game piece 128 to the player. The game piece 128, as will be explained with reference to the following examples in FIGS. 4-7, may include a hidden image 130 and may have a game piece identifier 132, which may be part of the hidden image 130. The game piece 128 may have other sections and elements as well; for example, the game piece 128 may have an informational section 134 and a security element 142, as also explained in greater detail below.

Figure 4A:
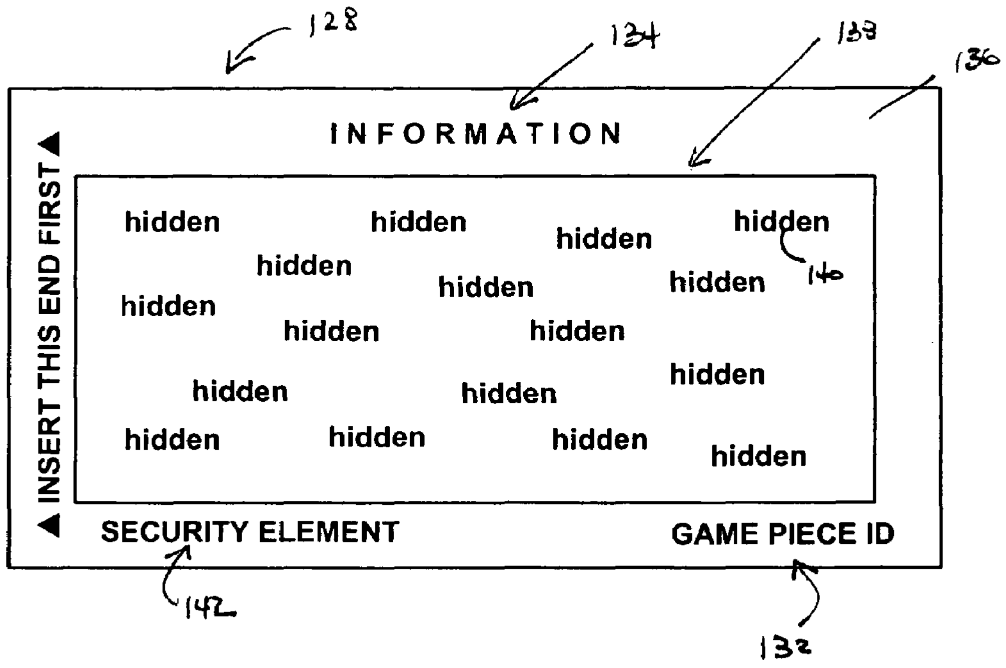
FIG. 4A is a plan view of an embodiment of an additive light game piece containing a hidden image, with the hidden image concealed.
Figure 4B:
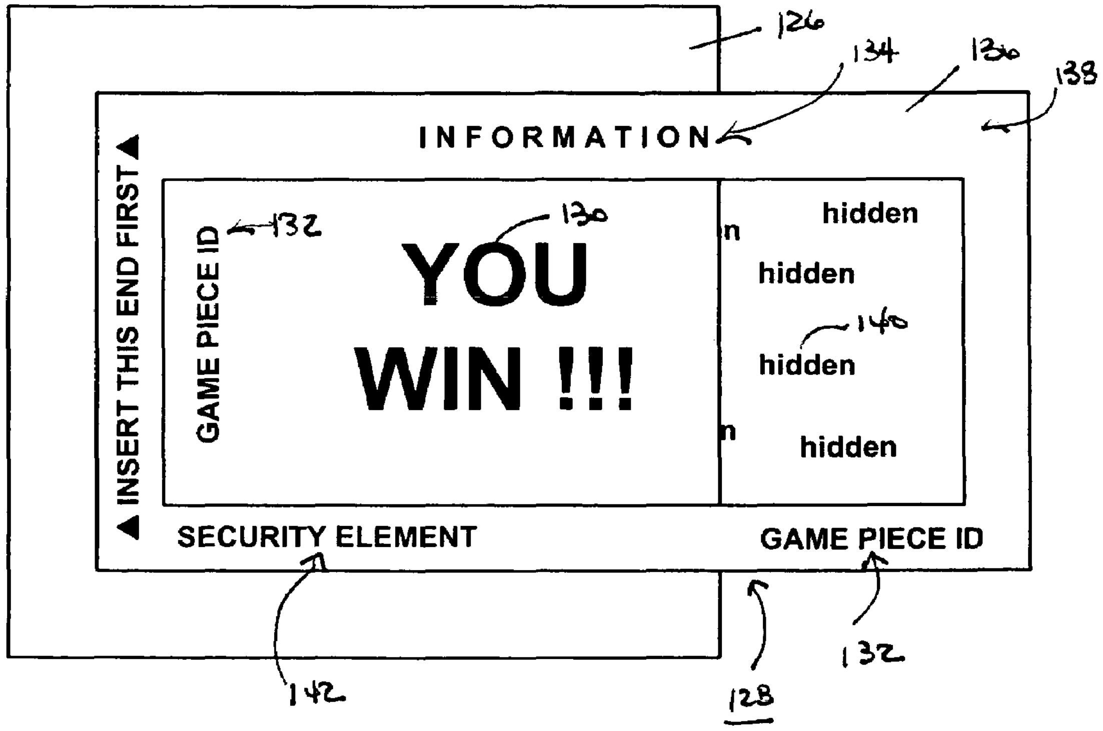
FIG. 4B is a plan view of the additive light game piece containing a hidden image of FIG. 4A, with the hidden image revealed.

A first embodiment of the game piece 128 is illustrated in FIGS. 4A and 4B. According to this embodiment, the game piece 128 may include a frame 136 that may be of paper or another printable or encodable material, although the game piece 128 may function without the inclusion of the frame 136. Attached to the frame 136 may be a substrate 138 that may be transparent, translucent or opaque. One or more inks, for example, may be used to create the hidden image 130 on the substrate 138, such that when the hidden image revealer 126, in the form of a light source, for example, is placed behind the substrate 138, the hidden image 130 becomes visible and/or detectable.

In particular, the first embodiment of the game piece 128 may be an additive light game piece, such as is believed to be marketed by the Global Commerce Group, of Cumming, Ga. under the WEB DECODER tradename and as is believed to be described in at least U.S. Pat. No. 6,406,062, which patent is hereby incorporated by reference herein in its entirety for all purposes. According to such an additive light game piece, a concealing image 140 may be used to conceal the hidden image 130. The concealing image 140 may have a different color than the hidden image 130, and when an additive light of a complementary color to the concealing image 140 is placed behind the game piece 128, and in particular the substrate 138, and shines through the substrate 138, the hidden image 130 may become visible and/or detectable. Without the aid of the external additive light source, the hidden image 130 may be not visible and/or detectable, or only partially so.

Such an additive light game piece may be formed in the following fashion. The hidden image 130 may be defined on a surface of the substrate 138 by applying a first color ink (e.g., high density fluorescent yellow ink), by printing, for example. The concealing image 140 may then be defined on the surface of the substrate 138 over the hidden image 130 by applying a second color ink (e.g., high density fluorescent process cyan ink), also by printing, for example. The concealing image 140 may cover the entirety of the hidden image 130, although the concealing image 140 may also merely limit the visibility or detectability of the hidden image 130. As is illustrated in FIG. 4B, when such a game piece 128 is held in front of the hidden image revealer 126, in this case a source of additive light of the correct color (blue), the hidden image 140 may become visible to the user and/or detectable.

It will be recognized that numerous variations are possible in regard to the additive light game piece just described, as well as possible alternatives thereto. For example, other color inks may be used than those described above. Further, rather than the light source providing light of complementary color, the light source may provide a pattern of complementary color that causes the hidden image 130 to be revealed when the pattern of complementary color cooperates with the concealing image 140, which may also be defined in a particular pattern.

As for the other elements of this embodiment of the game piece 128, it will be recognized that a game piece identifier 132 is also illustrated. In particular, the game piece identifier 132 is illustrated in two different locations: on the frame 136 of the game piece 128 in the lower right-hand corner and as part of the hidden image 130 along the left-hand edge of the substrate 138. However, this is by way of illustration only; the location of the game piece identifier 132 on the game piece 128, the number of locations in which the game piece identifier 132 may be defined on the game piece 128, and even the form in which the game piece identifier 132 may take may be varied within the scope of the present disclosure. Thus, the game piece identifier 132 may be defined in more than one location on the game piece 128, or only in one location. Moreover, the game piece identifier 132 may be in the form of, for example, a series of alphanumeric symbols (i.e., A through Z and 0 through 9), or a primarily machine-readable code, such as a bar code, an optical code, or a magnetic code. The use of the game piece identifier 132 will be explained in greater detail with reference to the method of operation of the game system 120, below.

Additionally, an information section 134 is also illustrated in the embodiment of FIGS. 4A and 4B. The information section 134 may be defined in a form that is readable by the player, and may contain informational items such as: a casino name; a game or event name; a date and time of issuance of the game piece 128; redemption instructions and restrictions; and any other information that may be necessary or desirable (e.g., a bar code with control data). This information may be printed with an optically readable material such as ink using alphanumeric symbols, or may be encoded in a primarily machine-readable form, such as a bar code, a optical code or a magnetic encoding.

Furthermore, a security element 142 may be included, as illustrated in the embodiment of FIGS. 4A and 4B, to prevent possible tampering with or theft of the game piece 128. The security element 142, like the information section 134, may be defined in a form that can be analyzed by the player or a casino employee; in the alternative, the security element may be in a form that can be read using a machine (e.g., a bar code). Thus, the security element 142 may be a bar-code or other glyph disposed on or in the substrate 138, hidden image 130, or the frame 136 (as illustrated in FIGS. 4A and 4B). Alternatively, the security element 142 may be a special pattern using a color similar to that used for the hidden image. As further alternatives, a camera associated with the gaming unit 20, 30 may be used to take a picture of the player, which picture may be disposed on the frame 136 or the substrate 138, or a fingerprint sensor may be used to record the player's thumbprint, and a representation of the thumbprint may be disposed on or in the substrate 138, hidden image 130, or the frame 136. As a still further alternative, the security element 142 may be an active or passive radio frequency transponder, also known as an RFID tag, which may be electronically programmed with unique information and which may communicate via an antenna with a transceiver (and an associated decoder) as part of a radio frequency identification system. Other alternative security elements may be used as are in keeping with the above-disclosure and the characteristics of the game piece 128 under discussion. Also, the security element 142 may combined with or be a part of the information section 134.

Figure 5A:
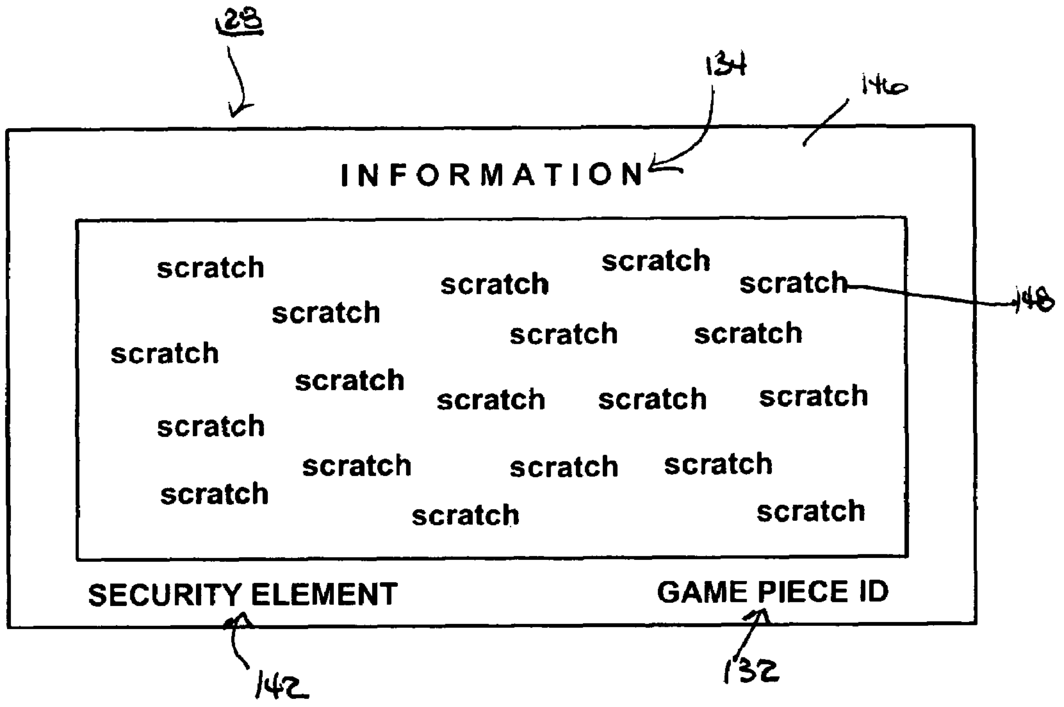
FIG. 5A is a plan view of an embodiment of a scratch-off game piece containing a hidden image, with the hidden image concealed.
Figure 5B:
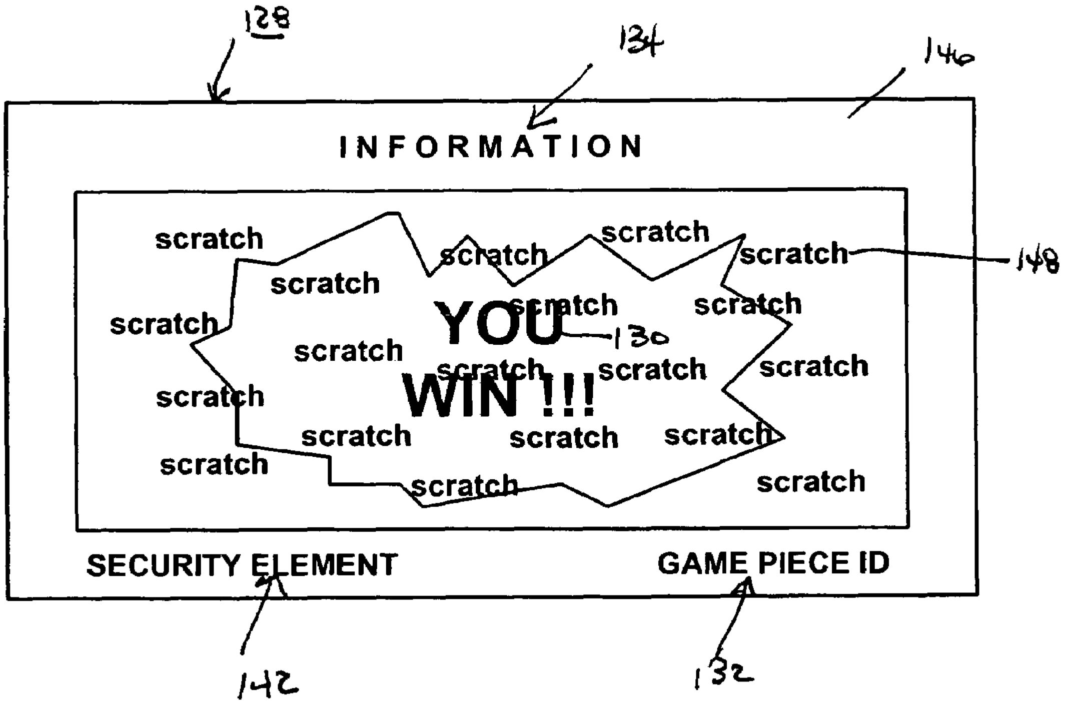
FIG. 5B is a plan view of the scratch-off game piece containing a hidden image of FIG. 5A, with the hidden image revealed.

Referring now to FIGS. 5A and 5B, a second embodiment of a game piece 128 is illustrated. The game piece 128 may comprise a substrate 146, which may be paper or another printable or encodable material. The hidden image 130 may be defined on a surface of the substrate 138 by applying ink, by printing, for example. A concealing image 148 may then be defined on the surface of the substrate 146 over the hidden image 130 by applying a layer or a pattern of a material that can be removed by scratching the surface with a finger nail or a coin, for example. If the concealing image 148 is removed by scratching off the concealing image 148, the hidden image 130 may become visible and/or detectable. Otherwise, the hidden image 130 may be not visible and/or detectable, or only partially so. A game piece identifier 132 and an information section 134 may also be provided.

Figure 6A:
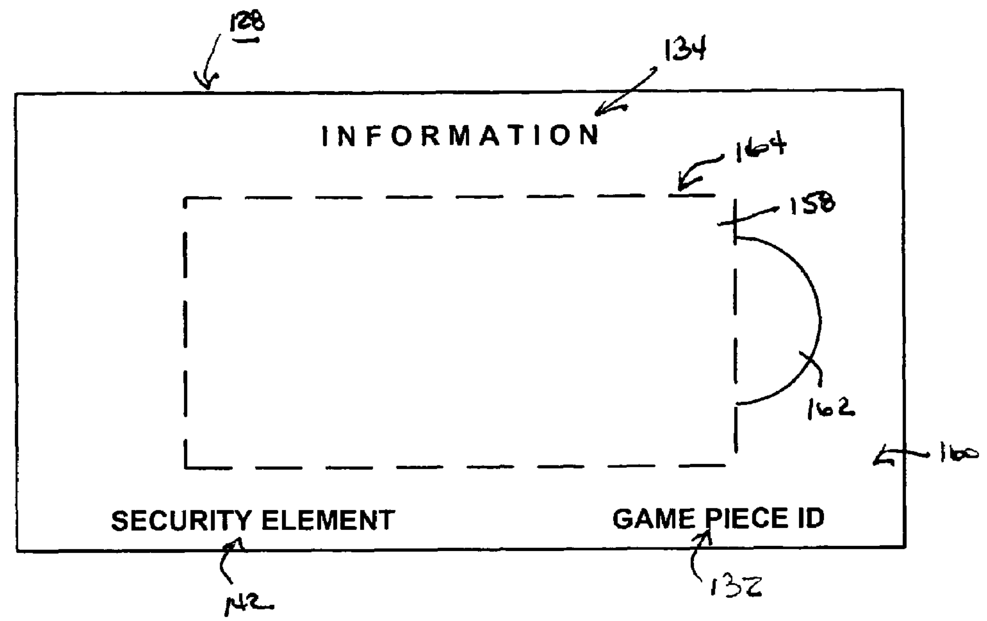
FIG. 6A is a plan view of an embodiment of a pull-tab game piece containing a hidden image, with the hidden image concealed.
Figure 6B:
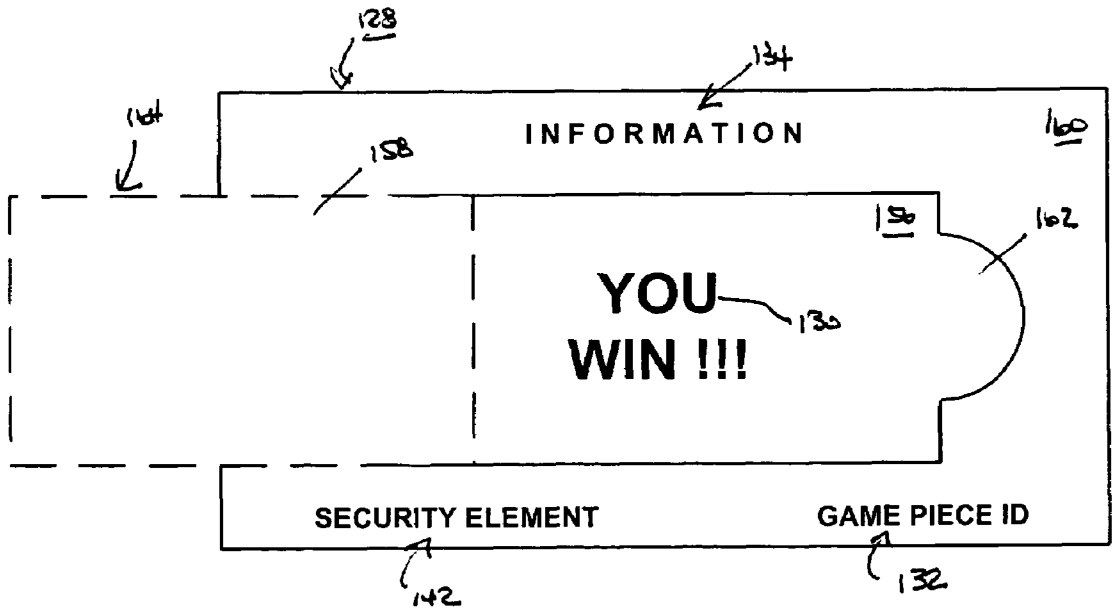
FIG. 6B is a plan view of the pull-tab game piece containing a hidden image of FIG. 6A, with the hidden image revealed.

Turning next to FIGS. 6A and 6B, a third embodiment of a game piece 128 is illustrated. The game piece 128 may include a first substrate 156, which may be paper or another printable or encodable material. The hidden image 130 may be defined on a surface of the first substrate 156 by applying ink, by printing, for example. A concealing flap or tab 158 may be defined in a second substrate 160 that is disposed over the hidden image and is attached to the first substrate 156. In particular, the concealing tab 158 may be defined by perforating the second substrate 160. A further section 162 of the second substrate 160 may be removed to ease the process of separating the tab 158 from the remainder of the substrate 160 along perforations 164. If the concealing tab 158 is lifted or separated in whole or in part from the second substrate 160 so as to tear the second substrate 160 along the perforations 164, the hidden image 130 may become visible and/or detectable. Otherwise, the hidden image 130 may be not visible and/or detectable, or only partially so. A game piece identifier 132 and an information section 134 may also be provided.

While certain embodiments of the game piece 128 have been shown, it will be recognized that the game piece 128 may be any size or shape. Moreover, the game pieces 128 may include other known or yet to be developed types of game pieces with hidden images defined thereon. For example, the game pieces 128 may include a hidden image 130 that is revealed when the concealing image, layer or substrate is exposed to, for example, natural light, artificial light, chemicals, an electric current or voltage or a change in temperature or orientation.

Figure 7A:
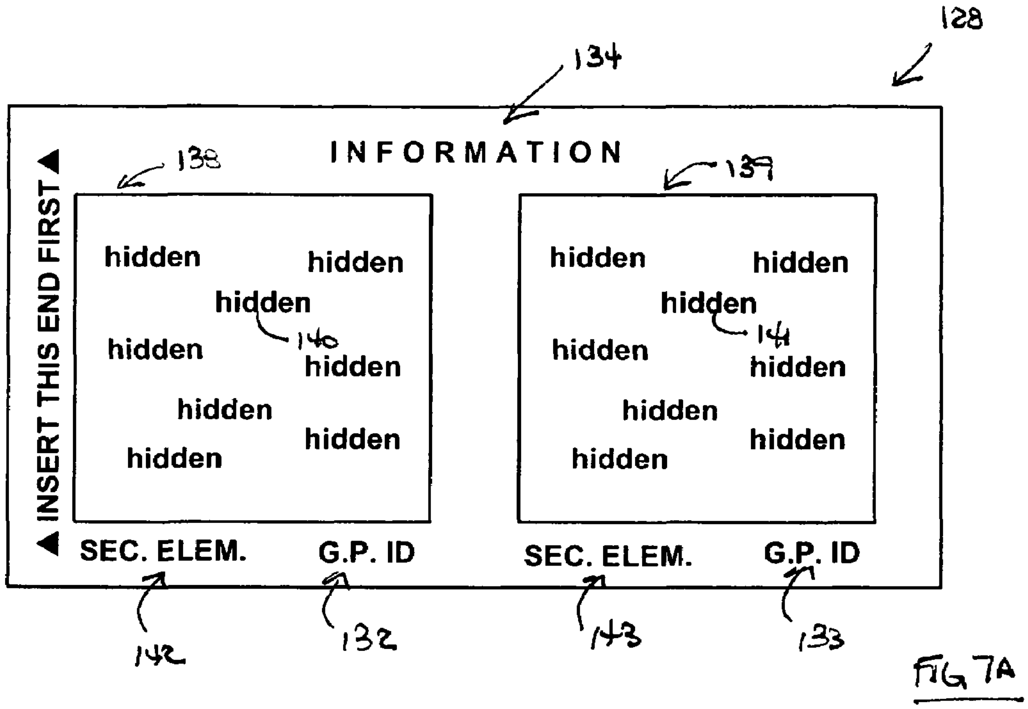
FIG. 7A is a plan view of a multi-image game piece similar to that illustrated in FIG. 4A, with the hidden images concealed.
Figure 7B:
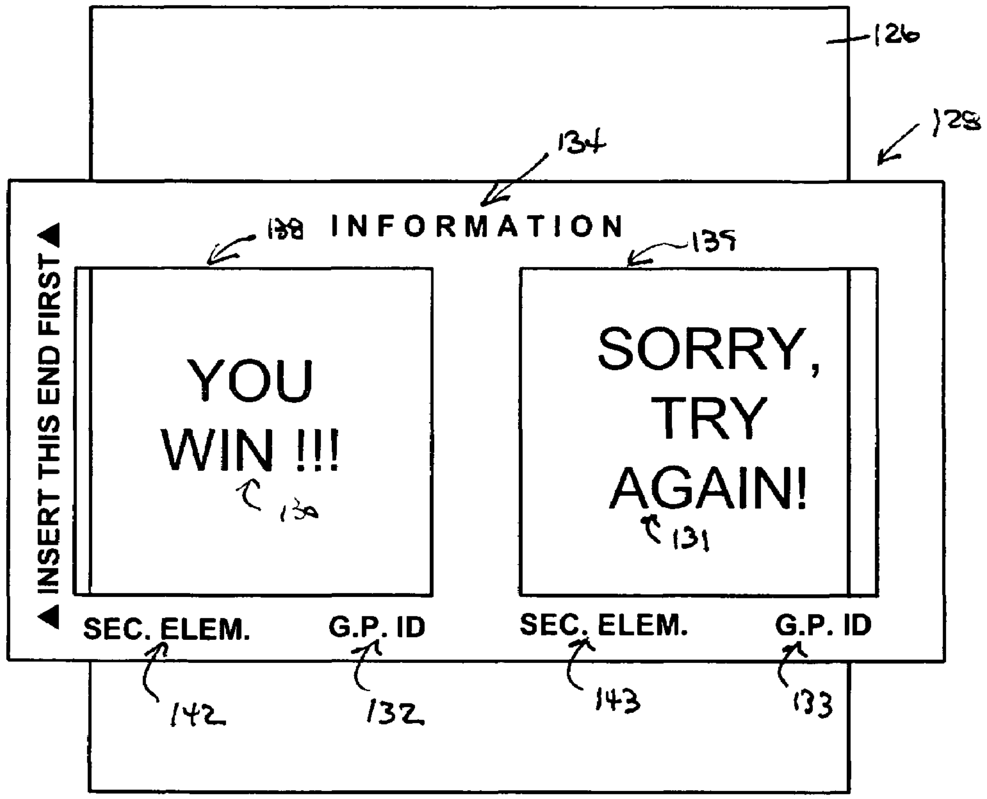
FIG. 7B is a plan view of the multi-image game piece of FIG. 7A, with the hidden images revealed.

Moreover, the game piece 128 may include more than one hidden image. For example, a game piece 128 is shown in FIGS. 7A and 7B where two substrates 138, 139, similar to those shown in FIGS. 4A and 4B, may be attached to or associated with a single frame 136. While two substrates 138, 139 are shown, alternatively two sections of a common substrate may be used. A hidden image 130, 131 is applied to each of the substrates 138, 139, and a concealing image 140, 141 is applied over the hidden image 130, 131. According to the description regarding the embodiment of FIG. 4, above, the hidden images 130, 131 and concealing images 140, 141 may be formed using different color inks, such that the hidden images 130, 131 are not substantially visible or detectable unless disposed in front of the hidden image revealer 126 (FIG. 7B).

Additionally, to maintain the element of surprise as long as possible, the first hidden image 130 may be concealed using a different method than the second image 131, for example, by using a different ink for the concealing image 140 than for the concealing image 141. As a consequence, when the revealer 126 provides a first additive color or pattern to reveal the first image 130, this additive color or pattern may not reveal the second image 131, even though the game piece 128 is held up to the revealer 126 such that both sections of the ticket are illuminated by the revealer 126. Instead, a second additive color and/or pattern may be displayed on or by the hidden image revealer 126 to cause the second hidden image 131 to be substantially visible and/or detectable, at which point the first hidden image 130 is not substantially visible and/or detectable.

Moreover, more than one game identifier 132, 133 may be defined on the frame 136, each game identifier 132, 133 associated with one of the hidden images 130, 131 disposed on the substrates 138, 139. The game identifiers 132, 133 may thus be detected separately by the game piece identification device 124. Alternatively, a single game identifier may be associated with both hidden images 130, 131, and may access different data stored in memory concerning the hidden images 130, 131 on the game piece 128. The same is the case for security element 142, 143, as illustrated.

Given the great variation possible in the game pieces 128, as just discussed, there also may be a great variation in the game piece dispenser 122 that may provide the game pieces 128 to the player. For example, the game piece dispenser 122 may associated with a hopper 170, and the hopper 170 may be loaded with pre-formed game pieces 128. That is, the game pieces 128 may be ready to be provided to the player when disposed in the hopper 170, and the game dispenser 122 may withdraw or receive the game piece 128 from the hopper 170 and then provide the game piece 128 to the player. Alternatively, the hopper 170 may be loaded with partially formed game pieces 128, or blanks or stocks of substrates 138, 146, 156 that must be fabricated into the game piece 128 before the game piece 128 may be provided to the player. In this instance, the game piece dispenser 122 would need to be configured to define the hidden image 130 on the substrate 138, 146, 156, and then to conceal the image with a concealing image 140, 148 or tab 158, before providing the game piece 128 to the player.

As an example of an embodiment of a game piece dispenser 122 of the type that fabricates the game piece 128 and then provides the game piece 128 to the player, a game piece dispenser 122 is now described that may be used to fabricate and provide the game piece 128 shown in FIGS. 4A and 4B. According to this embodiment, the game piece dispenser 122 may include the hopper 170 loaded with a plurality of blanks, each blank including a substrate 138 attached to a frame 136. The game piece dispenser 122 also includes a printer 172, which may be the same device as was previously indicated as the ticket printer/reader 56 and which may be capable of printing in at least two colors of ink—one color for the hidden image 130 and another for the concealing image 140. The printer 172 may apply the first color ink on the substrate 138 to define the hidden image 130, and then apply the second color ink on the substrate 138 to define the concealing image 140. The printer 172 may also be capable of printing in a third color, and thus may be capable of forming the game piece identifier 132 and information carried in the informational section 134 in a different color than the hidden and concealing images 130, 140. Alternatively, the game piece identifier 132 and the information carried in the informational section 134 may be pre-printed or pre-formed on the blanks loaded in the hopper 170.

Given the variety in game pieces 128, there is a further similar variation in the structure and operation of, and in fact even the requirement of, the hidden image revealer 126. While some game pieces, such as those shown in FIGS. 5 and 6 may not require a revealer 126, others, such as that shown in FIGS. 4 and 7, may. Moreover, it may be possible to combine the game piece types shown in FIGS. 4-6 to provide a game piece that may not require a revealer 126 for some information, but may require a revealer 126 for others. For example, a game piece 128 may have some or all of the hidden image 130 concealed behind a tab, as in the game piece of FIG. 6, and encoded in multicolored inks, as in the game piece of FIG. 4.

Again, with reference to the game piece of FIG. 4, the game piece revealer 126 may be a separate light source that does not have a role in the operation of the gaming unit 20, as explained in greater detail below, other than as part of the game system 120. This light source may be a bulb, or a display unit, such as a CRT, LCD or other form of display. Alternatively, the light source may be provided by the display unit 70, in whole or in part, or by a secondary display associated with the player tracking module 60, for example.

Furthermore, given the variation described above in regard to the placement and form of the game piece identifier 132, there may be a wide variety in the type, form and location of the game piece identification device 124 required. Depending on the form of the game piece identifier 132, the game piece identification device 124 may include a touch-sensitive display, a keyboard or keypad, a bar code scanner, an optical scanner, a magnetic scanner, a light sensor, or any combination thereof For example, if the game piece identifier 132 is in alphanumeric form, the game piece identification device 124 may include a touch-screen or touch-sensitive display, keyboard or keypad, which device may be operated by the player or by employees of the casino or operator of the gaming system 10 and associated game system 120. Alternatively, if the game piece identifier 132 is in the form of a bar code, then the game identification device 124 may include a bar code scanner. Further, where the game piece identifier 132 may be included as part of the hidden image, as in the embodiment of FIG. 4, the game piece identifier may include one or more light sensors, which may detect the pattern of light passing through the substrate 138 and provide a signal to the controller 100 according to the light pattern detected. The controller 100 may then, in turn, determine the game piece identifier 132 associated with the game piece 128 according to the signal associated with the light pattern detected.

Furthermore, as was the case with the hidden image revealer 126, the game piece identification device 124 may include one or more of the devices already discussed. As one example, the game piece dispenser 122 may also be configured to read the game pieces 128, or at least the game piece identifier 132 formed on the game pieces 128. As a further example, the game piece identification device may include the ticket printer/reader 56. Alternatively, the game piece identification device may include the card reader 58, a keypad associated with the player tracking module 60, or the control panel 66 (which may be a touch-screen).

Additionally, while the location of the game piece identifier 132 on the game piece 128 need not be limited to any particular location, in those embodiments wherein the game piece identification device 124 includes a scanner or sensor, it may be desirable to standardize the location of the game piece identifier 132 on the game piece and/or standardize the manner in which the game piece 128 is disposed relative to the game piece identification device 124 when the game piece identifier 132 is being read. For example, with reference to FIG. 4A, the game piece identifier 132 may be disposed in a standard location on the game piece 128, i.e., in the lower right-hand corner. Moreover, along the left edge of the substrate may be disposed symbols and/or alphanumeric messages to instruct the player or employee in the proper orientation of the game piece 128 relative to the game piece identification device 124 during the detection of the game piece identifier 132.

Overall Operation of Gaming Unit

One manner in which one or more of the gaming units 20 (and one or more of the gaming units 30) may operate is described below in connection with a number of flowcharts which represent a number of portions or routines of one or more computer programs, which may be stored in one or more of the memories of the controller 100. The computer program(s) or portions thereof may be stored remotely, outside of the gaming unit 20, and may control the operation of the gaming unit 20 from a remote location. Such remote control may be facilitated with the use of a wireless connection, or by an Internet interface that connects the gaming unit 20 with a remote computer (such as one of the network computers 22, 32) having a memory in which the computer program portions are stored. The computer program portions may be written in any high level language such as C, C++, C#, Java or the like or any low-level assembly or machine language. By storing the computer program portions therein, various portions of the memories 102, 106 are physically and/or structurally configured in accordance with computer program instructions.

Figure 8:
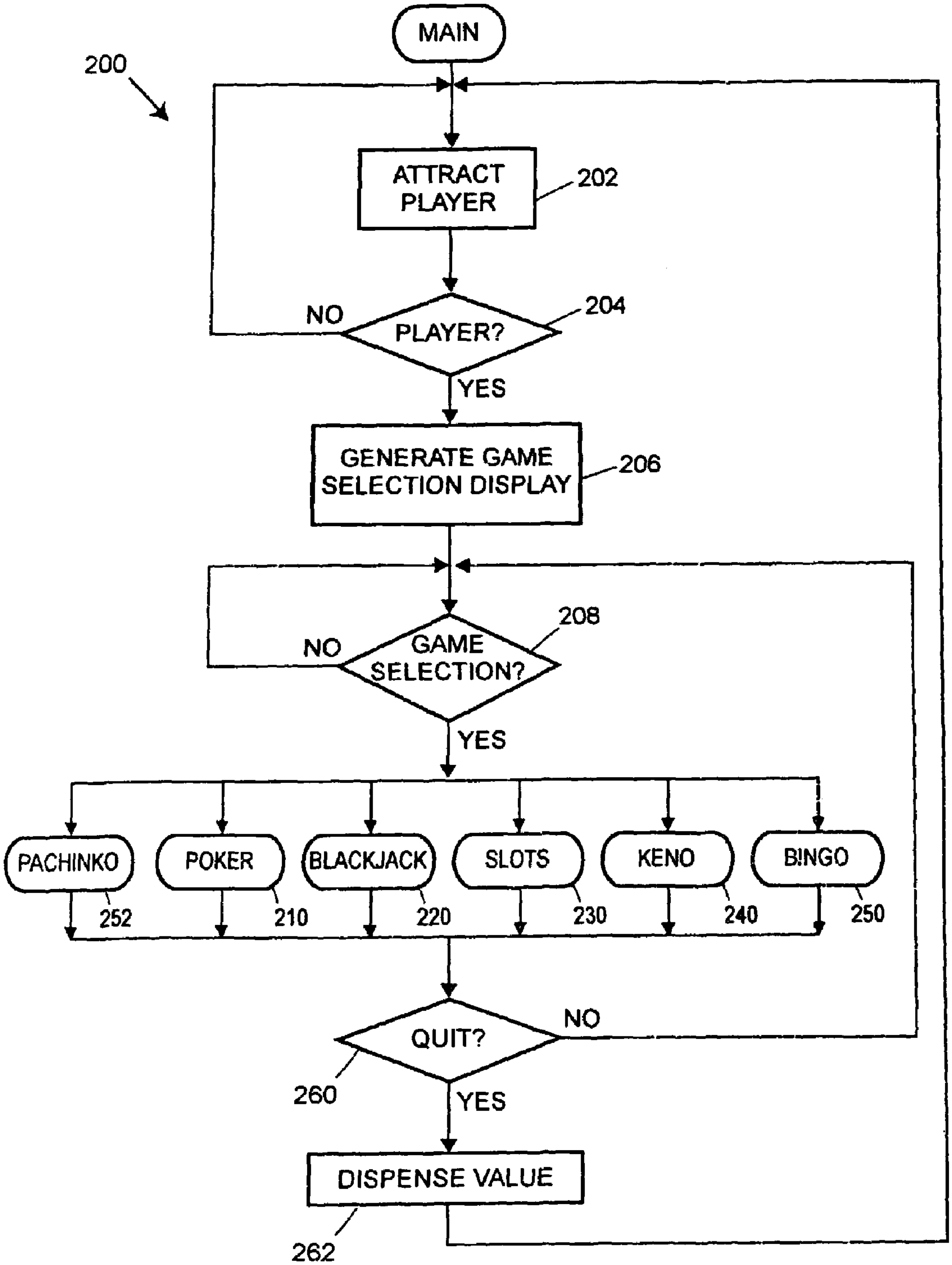
FIG. 8 is a flowchart of an embodiment of a main routine that may be performed during operation of one or more of the gaming units.

FIG. 8 is a flowchart of a main operating routine 200 that may be stored in the memory of the controller 100. Referring to FIG. 8, the main routine 200 may begin operation at block 202 during which an attraction sequence may be performed in an attempt to induce a potential player in a casino to play the gaming unit 20. The attraction sequence may be performed by displaying one or more video images on the display unit 70 and/or causing one or more sound segments, such as voice or music, to be generated via the speakers 62. The attraction sequence may include a scrolling list of games that may be played on the gaming unit 20 and/or video images of various games being played, such as video poker, video blackjack, video slots, video keno, video bingo, etc.

During performance of the attraction sequence, if a potential player makes any input to the gaming unit 20 as determined at block 204, the attraction sequence may be terminated and a game-selection display may be generated on the display unit 70 at block 206 to allow the player to select a game available on the gaming unit 20. The gaming unit 20 may detect an input at block 204 in various ways. For example, the gaming unit 20 could detect if the player presses any button on the gaming unit 20; the gaming unit 20 could determine if the player deposited one or more coins into the gaming unit 20; the gaming unit 20 could determine if player deposited paper currency into the gaming unit; etc.

The game-selection display generated at block 206 may include, for example, a list of video games that may be played on the gaming unit 20 and/or a visual message to prompt the player to deposit value into the gaming unit 20. While the game-selection display is generated, the gaming unit 20 may wait for the player to make a game selection. Upon selection of one of the games by the player as determined at block 208, the controller 100 may cause one of a number of game routines to be performed to allow the selected game to be played. For example, the game routines could include a video poker routine 210, a video blackjack routine 220, a slots routine 230, a video keno routine 240, a video bingo routine 250, and a video pachinko routine 252. At block 208, if no game selection is made within a given period of time, the operation may branch back to block 202.

After one of the routines 210, 220, 230, 240, 250, 252 has been performed to allow the player to play one of the games, block 260 may be utilized to determine whether the player wishes to terminate play on the gaming unit 20 or to select another game. If the player wishes to stop playing the gaming unit 20, which wish may be expressed, for example, by selecting a "Cash Out" button, the controller 100 may dispense value to the player at block 262 based on the outcome of the game(s) played by the player. The operation may then return to block 202. If the player did not wish to quit as determined at block 260, the routine may return to block 208 where the game-selection display may again be generated to allow the player to select another game.

It should be noted that although six gaming routines are shown in FIG. 8, a different number of routines could be included to allow play of a different number of games. The gaming unit 20 may also be programmed to allow play of different games.

Figure 9:
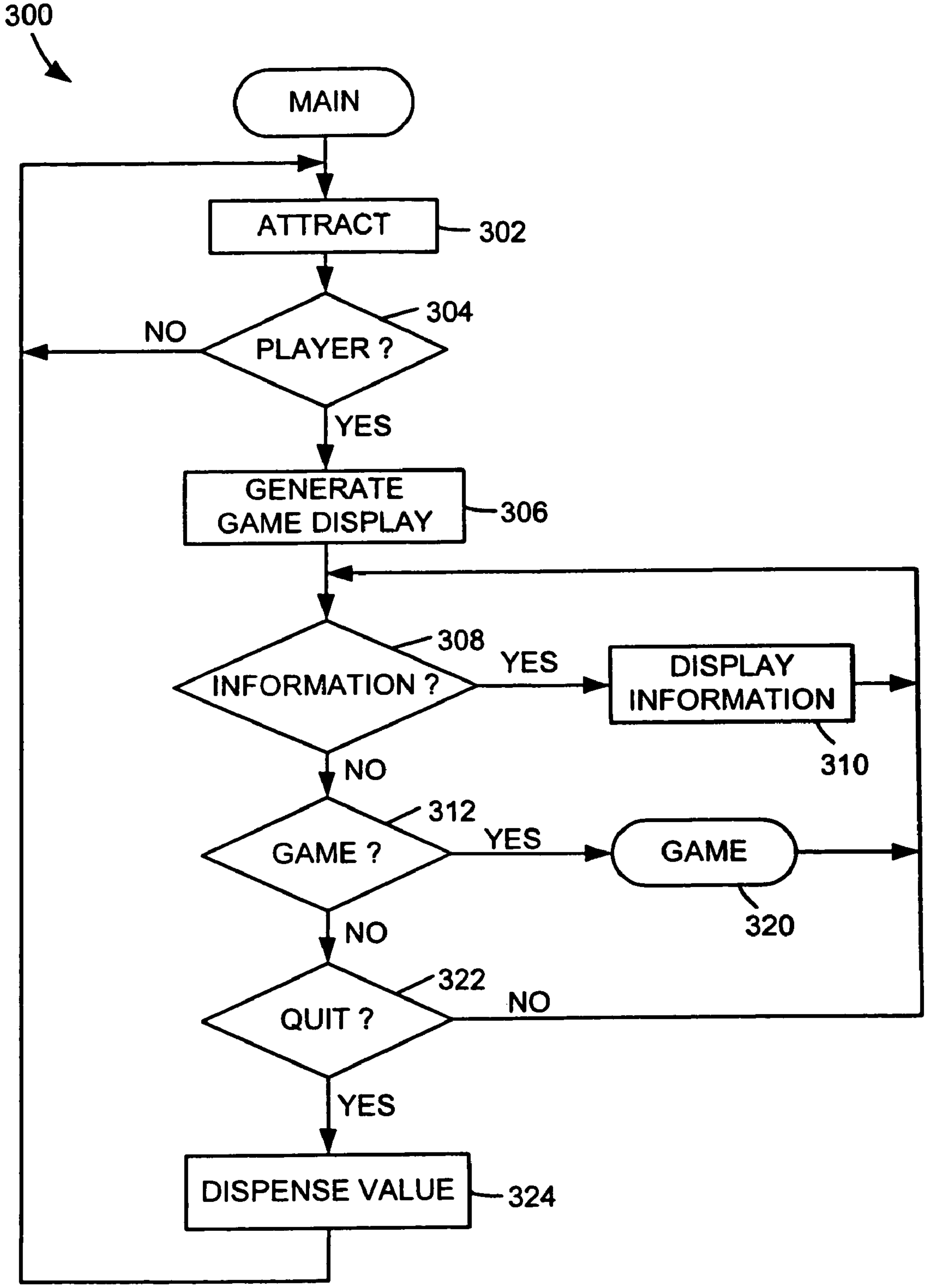
FIG. 9 is a flowchart of an alternative embodiment of a main routine that may be performed during operation of one or more of the gaming units.

FIG. 9 is a flowchart of an alternative main operating routine 300 that may be stored in the memory of the controller 100. The main routine 300 may be utilized for gaming units 20 that are designed to allow play of only a single game or single type of game. Referring to FIG. 9, the main routine 300 may begin operation at block 302 during which an attraction sequence may be performed in an attempt to induce a potential player in a casino to play the gaming unit 20. The attraction sequence may be performed by displaying one or more video images on the display unit 70 and/or causing one or more sound segments, such as voice or music, to be generated via the speakers 62.

During performance of the attraction sequence, if a potential player makes any input to the gaming unit 20 as determined at block 304, the attraction sequence may be terminated and a game display may be generated on the display unit 70 at block 306. The game display generated at block 306 may include, for example, an image of the casino game that may be played on the gaming unit 20 and/or a visual message to prompt the player to deposit value into the gaming unit 20. At block 308, the gaming unit 20 may determine if the player requested information concerning the game, in which case the requested information may be displayed at block 310. Block 312 may be used to determine if the player requested initiation of a game, in which case a game routine 320 may be performed. The game routine 320 could be any one of the game routines disclosed herein, such as one of the five game routines 210, 220, 230, 240, 250, 252 or another game routine.

After the routine 320 has been performed to allow the player to play the game, block 322 may be utilized to determine whether the player wishes to terminate play on the gaming unit 20. If the player wishes to stop playing the gaming unit 20, which wish may be expressed, for example, by selecting a "Cash Out" button, the controller 100 may dispense value to the player at block 324 based on the outcome of the game(s) played by the player. The operation may then return to block 302. If the player did not wish to quit as determined at block 322, the operation may return to block 308.

Video Poker

Figure 10:
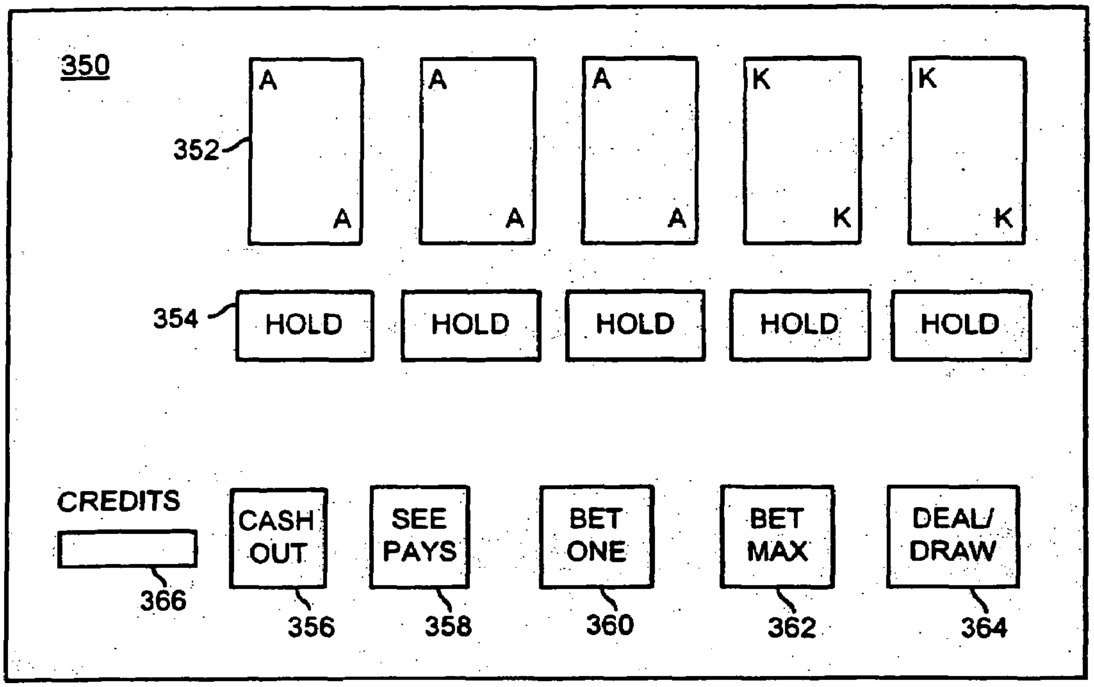
FIG. 10 is an illustration of an embodiment of a visual display that may be displayed during performance of the video poker routine of FIG. 12.

FIG. 10 is an exemplary display 350 that may be shown on the display unit 70 during performance of the video poker routine 210 shown schematically in FIG. 8. Referring to FIG. 10, the display 350 may include video images 352 of a plurality of playing cards representing the player's hand, such as five cards. To allow the player to control the play of the video poker game, a plurality of player-selectable buttons may be displayed. The buttons may include a "Hold" button 354 disposed directly below each of the playing card images 352, a "Cash Out" button 356, a "See Pays" button 358, a "Bet One Credit" button 360, a "Bet Max Credits" button 362, and a "Deal/Draw" button 364. The display 350 may also include an area 366 in which the number of remaining credits or value is displayed. If the display unit 70 is provided with a touch-sensitive screen, the buttons 354, 356, 358, 360, 362, 364 may form part of the video display 350. Alternatively, one or more of those buttons may be provided as part of a control panel that is provided separately from the display unit 70.

Figure 12:
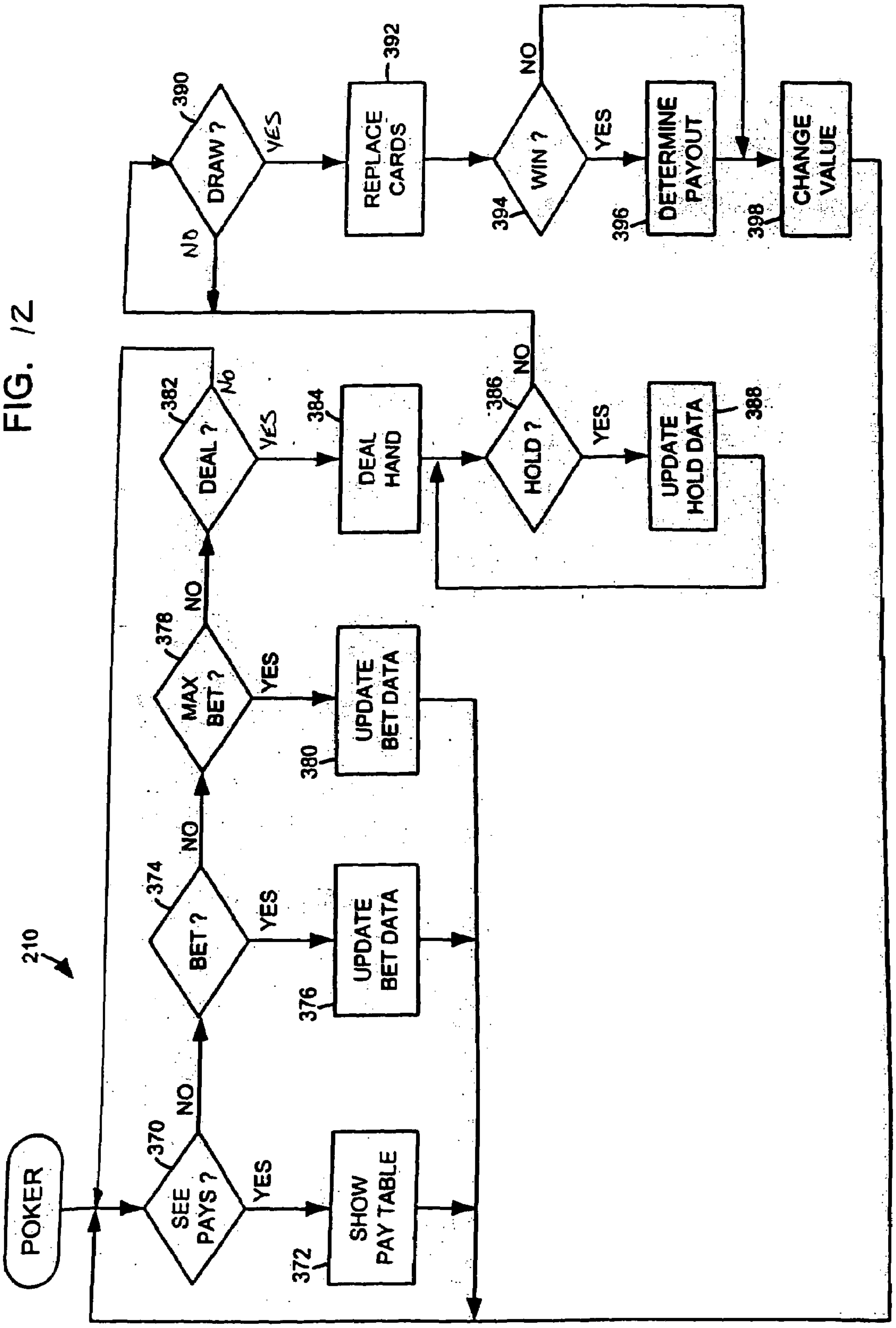
FIG. 12 is a flowchart of an embodiment of a video poker routine that may be performed by one or more of the gaming units.

FIG. 12 is a flowchart of the video poker routine 210 shown schematically in FIG. 8. Referring to FIG. 12, at block 370, the routine may determine whether the player has requested payout information, such as by activating the "See Pays" button 358, in which case at block 372 the routine may cause one or more pay tables to be displayed on the display unit 70. At block 374, the routine may determine whether the player has made a bet, such as by pressing the "Bet One Credit" button 360, in which case at block 376 bet data corresponding to the bet made by the player may be stored in the memory of the controller 100. At block 378, the routine may determine whether the player has pressed the "Bet Max Credits" button 362, in which case at block 380 bet data corresponding to the maximum allowable bet may be stored in the memory of the controller 100.

At block 382, the routine may determine if the player desires a new hand to be dealt, which may be determined by detecting if the "Deal/Draw" button 364 was activated after a wager was made. In that case, at block 384 a video poker hand may be "dealt" by causing the display unit 70 to generate the playing card images 352. After the hand is dealt, at block 386 the routine may determine if any of the "Hold" buttons 354 have been activated by the player, in which case data regarding which of the playing card images 352 are to be "held" may be stored in the controller 100 at block 388. If the "Deal/Draw" button 364 is activated again as determined at block 390, each of the playing card images 352 that was not "held" may be caused to disappear from the video display 350 and to be replaced by a new, randomly selected, playing card image 352 at block 392.

At block 394, the routine may determine whether the poker hand represented by the playing card images 352 currently displayed is a winner. That determination may be made by comparing data representing the currently displayed poker hand with data representing all possible winning hands, which may be stored in the memory of the controller 100. If there is a winning hand, a payout value corresponding to the winning hand may be determined at block 396. At block 398, the player's cumulative value or number of credits may be updated by subtracting the bet made by the player and adding, if the hand was a winner, the payout value determined at block 396. The cumulative value or number of credits may also be displayed in the display area 366 (FIG. 10).

Although the video poker routine 210 is described above in connection with a single poker hand of five cards, the routine 210 may be modified to allow other versions of poker to be played. For example, seven card poker may be played, or stud poker may be played. Alternatively, multiple poker hands may be simultaneously played. In that case, the game may begin by dealing a single poker hand, and the player may be allowed to hold certain cards. After deciding which cards to hold, the held cards may be duplicated in a plurality of different poker hands, with the remaining cards for each of those poker hands being randomly determined.

Video Blackjack

Figure 11:
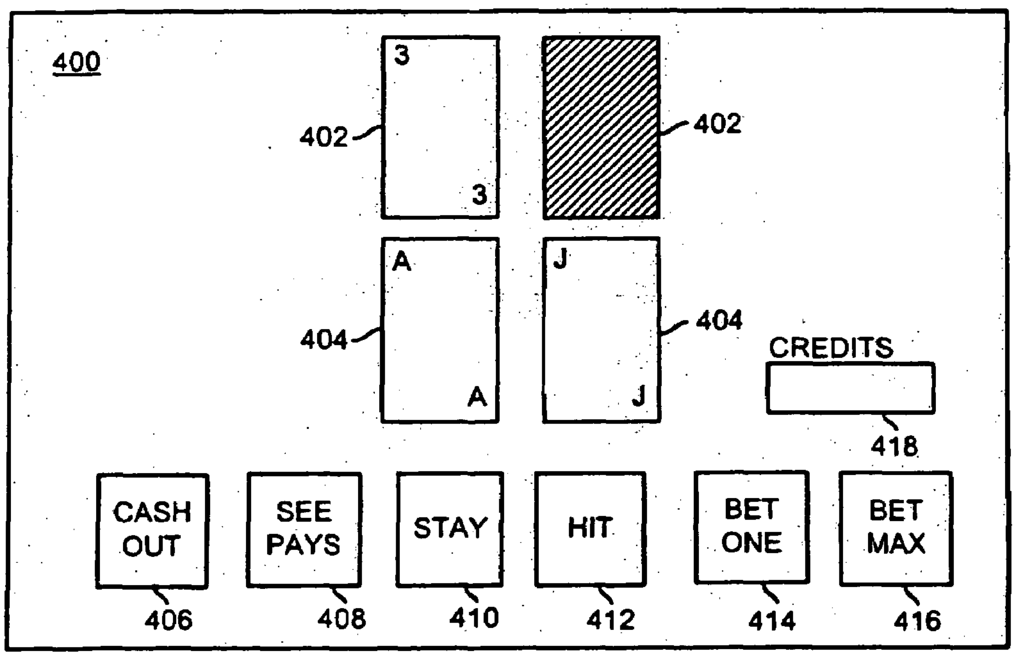
FIG. 11 is an illustration of an embodiment of a visual display that may be displayed during performance of the video blackjack routine of FIG. 13.

FIG. 11 is an exemplary display 400 that may be shown on the display unit 70 during performance of the video blackjack routine 220 shown schematically in FIG. 8. Referring to FIG. 11, the display 400 may include video images 402 of a pair of playing cards representing a dealer's hand, with one of the cards shown face up and the other card being shown face down, and video images 404 of a pair of playing cards representing a player's hand, with both the cards shown face up. The "dealer" may be the gaming unit 20.

To allow the player to control the play of the video blackjack game, a plurality of player-selectable buttons may be displayed. The buttons may include a "Cash Out" button 406, a "See Pays" button 408, a "Stay" button 410, a "Hit" button 412, a "Bet One Credit" button 414, and a "Bet Max Credits" button 416. The display 400 may also include an area 418 in which the number of remaining credits or value is displayed. If the display unit 70 is provided with a touch-sensitive screen, the buttons 406, 408, 410, 412, 414, 416 may form part of the video display 400. Alternatively, one or more of those buttons may be provided as part of a control panel that is provided separately from the display unit 70.

Figure 13:
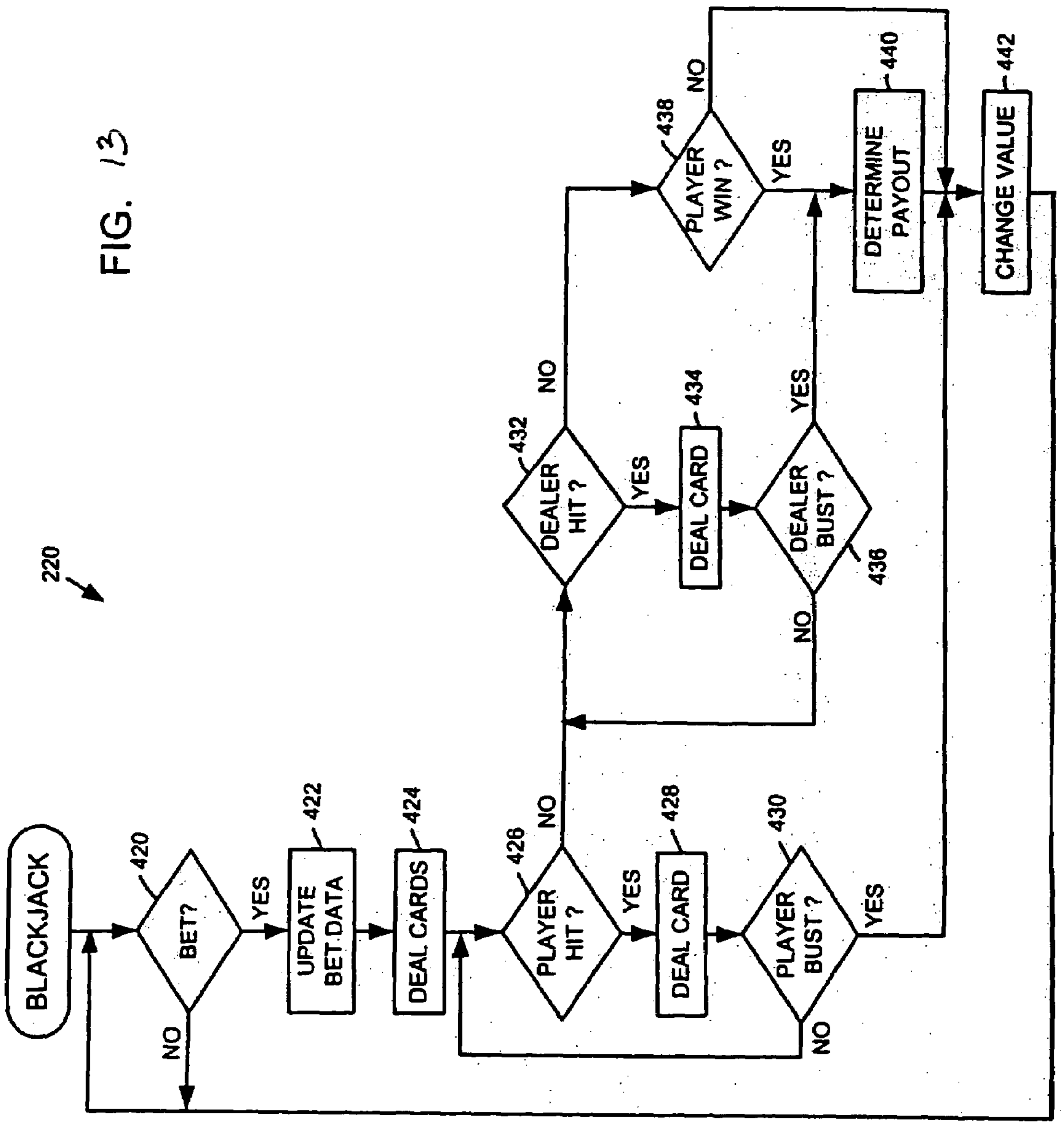
FIG. 13 is a flowchart of an embodiment of a video blackjack routine that may be performed by one or more of the gaming units.

FIG. 13 is a flowchart of the video blackjack routine 220 shown schematically in FIG. 8. Referring to FIG. 13, the video blackjack routine 220 may begin at block 420 where it may determine whether a bet has been made by the player. That may be determined, for example, by detecting the activation of either the "Bet One Credit" button 414 or the "Bet Max Credits" button 416. At block 422, bet data corresponding to the bet made at block 420 may be stored in the memory of the controller 100. At block 424, a dealer's hand and a player's hand may be "dealt" by making the playing card images 402, 404 appear on the display unit 70.

At block 426, the player may be allowed to be "hit," in which case at block 428 another card will be dealt to the player's hand by making another playing card image 404 appear in the display 400. If the player is hit, block 430 may determine if the player has "bust," or exceeded 21. If the player has not bust, blocks 426 and 428 may be performed again to allow the player to be hit again.

If the player decides not to hit, at block 432 the routine may determine whether the dealer should be hit. Whether the dealer hits may be determined in accordance with predetermined rules, such as the dealer always hit if the dealer's hand totals 15 or less. If the dealer hits, at block 434 the dealer's hand may be dealt another card by making another playing card image 402 appear in the display 400. At block 436 the routine may determine whether the dealer has bust. If the dealer has not bust, blocks 432, 434 may be performed again to allow the dealer to be hit again.

If the dealer does not hit, at block 436 the outcome of the blackjack game and a corresponding payout may be determined based on, for example, whether the player or the dealer has the higher hand that does not exceed 21. If the player has a winning hand, a payout value corresponding to the winning hand may be determined at block 440. At block 442, the player's cumulative value or number of credits may be updated by subtracting the bet made by the player and adding, if the player won, the payout value determined at block 440. The cumulative value or number of credits may also be displayed in the display area 418 (FIG. 11).

Slots

FIG. 14 is an exemplary display 450 that may be shown on the display unit 70 during performance of the slots routine 230 shown schematically in FIG. 8. Referring to FIG. 14, the display 450 may include video images 452 of a plurality of slot machine reels, each of the reels having a plurality of reel symbols 454 associated therewith. Although the display 450 shows five reel images 452, each of which may have three reel symbols 454 that are visible at a time, other reel configurations could be utilized.

To allow the player to control the play of the slots game, a plurality of player-selectable buttons may be displayed. The buttons may include a "Cash Out" button 456, a "See Pays" button 458, a plurality of payline-selection buttons 460 each of which allows the player to select a different number of paylines prior to "spinning" the reels, a plurality of bet-selection buttons 462 each of which allows a player to specify a wager amount for each payline selected, a "Spin" button 464, and a "Max Bet" button 466 to allow a player to make the maximum wager allowable.

Figure 16:
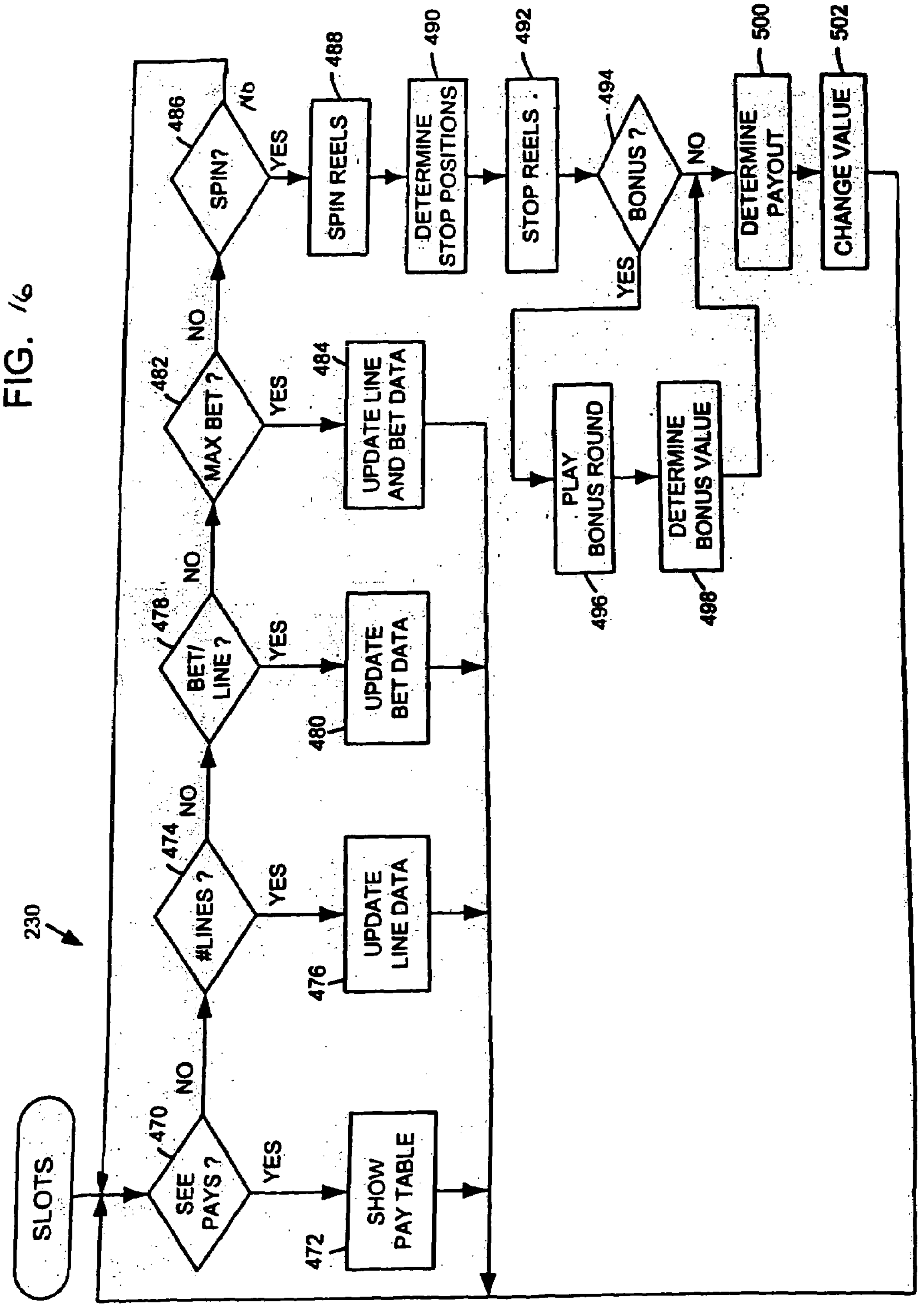
FIG. 16 is a flowchart of an embodiment of a slots routine that may be performed by one or more of the gaming units.

FIG. 16 is a flowchart of the slots routine 230 shown schematically in FIG. 8. Referring to FIG. 16, at block 470, the routine may determine whether the player has requested payout information, such as by activating the "See Pays" button 458, in which case at block 472 the routine may cause one or more pay tables to be displayed on the display unit 70. At block 474, the routine may determine whether the player has pressed one of the payline-selection buttons 460, in which case at block 476 data corresponding to the number of paylines selected by the player may be stored in the memory of the controller 100. At block 478, the routine may determine whether the player has pressed one of the bet-selection buttons 462, in which case at block 480 data corresponding to the amount bet per payline may be stored in the memory of the controller 100. At block 482, the routine may determine whether the player has pressed the "Max Bet" button 466, in which case at block 484 bet data (which may include both payline data and bet-per-payline data) corresponding to the maximum allowable bet may be stored in the memory of the controller 100.

If the "Spin" button 464 has been activated by the player as determined at block 486, at block 488 the routine may cause the slot machine reel images 452 to begin "spinning" so as to simulate the appearance of a plurality of spinning mechanical slot machine reels. At block 490, the routine may determine the positions at which the slot machine reel images will stop, or the particular symbol images 454 that will be displayed when the reel images 452 stop spinning. At block 492, the routine may stop the reel images 452 from spinning by displaying stationary reel images 452 and images of three symbols 454 for each stopped reel image 452. The virtual reels may be stopped from left to right, from the perspective of the player, or in any other manner or sequence.

The routine may provide for the possibility of a bonus game or round if certain conditions are met, such as the display in the stopped reel images 452 of a particular symbol 454. If there is such a bonus condition as determined at block 494, the routine may proceed to block 496 where a bonus round may be played. The bonus round may be a different game than slots, and many other types of bonus games could be provided. If the player wins the bonus round, or receives additional credits or points in the bonus round, a bonus value may be determined at block 498. A payout value corresponding to outcome of the slots game and/or the bonus round may be determined at block 500. At block 502, the player's cumulative value or number of credits may be updated by subtracting the bet made by the player and adding, if the slot game and/or bonus round was a winner, the payout value determined at block 500.

Although the above routine has been described as a virtual slot machine routine in which slot machine reels are represented as images on the display unit 70, actual slot machine reels that are capable of being spun may be utilized instead.

Video Keno

FIG. 15 is an exemplary display 520 that may be shown on the display unit 70 during performance of the video keno routine 240 shown schematically in FIG. 8. Referring to FIG. 15, the display 520 may include a video image 522 of a plurality of numbers that were selected by the player prior to the start of a keno game and a video image 524 of a plurality of numbers randomly selected during the keno game. The randomly selected numbers may be displayed in a grid pattern.

To allow the player to control the play of the keno game, a plurality of player-selectable buttons may be displayed. The buttons may include a "Cash Out" button 526, a "See Pays" button 528, a "Bet One Credit" button 530, a "Bet Max Credits" button 532, a "Select Ticket" button 534, a "Select Number" button 536, and a "Play" button 538. The display 520 may also include an area 540 in which the number of remaining credits or value is displayed. If the display unit 70 is provided with a touch-sensitive screen, the buttons may form part of the video display 520. Alternatively, one or more of those buttons may be provided as part of a control panel that is provided separately from the display unit 70.

Figure 17:
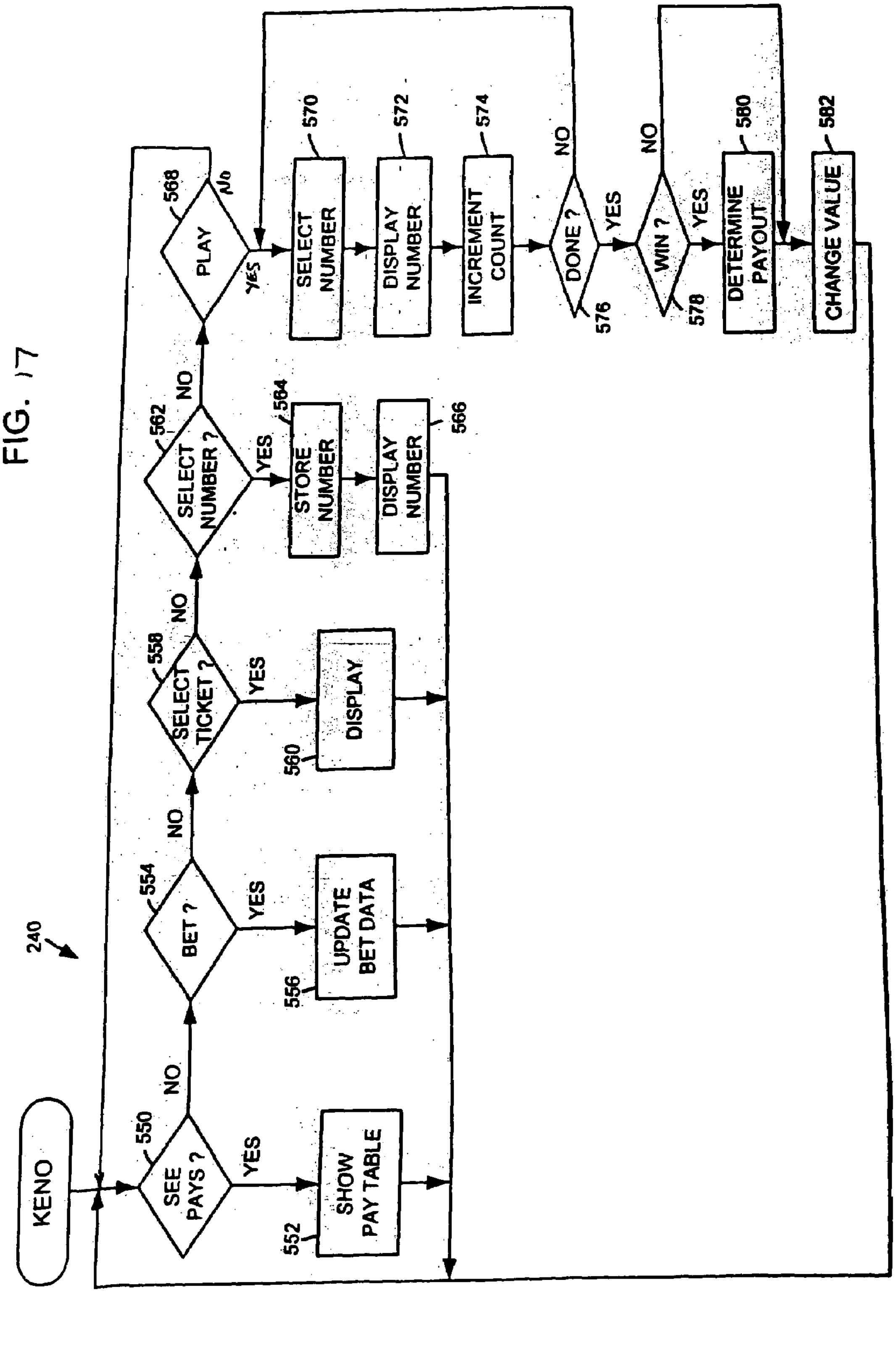
FIG. 17 is a flowchart of an embodiment of a video keno routine that may be performed by one or more of the gaming units.

FIG. 17 is a flowchart of the video keno routine 240 shown schematically in FIG. 8. The keno routine 240 may be utilized in connection with a single gaming unit 20 where a single player is playing a keno game, or the keno routine 240 may be utilized in connection with multiple gaming units 20 where multiple players are playing a single keno game. In the latter case, one or more of the acts described below may be performed either by the controller 100 in each gaming unit or by one of the network computer 22, 32 to which multiple gaming units 20 are operatively connected.

Referring to FIG. 17, at block 550, the routine may determine whether the player has requested payout information, such as by activating the "See Pays" button 528, in which case at block 552 the routine may cause one or more pay tables to be displayed on the display unit 70. At block 554, the routine may determine whether the player has made a bet, such as by having pressed the "Bet One Credit" button 530 or the "Bet Max Credits" button 532, in which case at block 556 bet data corresponding to the bet made by the player may be stored in the memory of the controller 100. After the player has made a wager, at block 558 the player may select a keno ticket, and at block 560 the ticket may be displayed on the display 520. At block 562, the player may select one or more game numbers, which may be within a range set by the casino. After being selected, the player's game numbers may be stored in the memory of the controller 100 at block 564 and may be included in the image 522 on the display 520 at block 566. After a certain amount of time, the keno game may be closed to additional players (where a number of players are playing a single keno game using multiple gambling units 20).

If play of the keno game is to begin as determined at block 568, at block 570 a game number within a range set by the casino may be randomly selected either by the controller 100 or a central computer operatively connected to the controller, such as one of the network computers 22, 32. At block 572, the randomly selected game number may be displayed on the display unit 70 and the display units 70 of other gaming units 20 (if any) which are involved in the same keno game. At block 574, the controller 100 (or the central computer noted above) may increment a count which keeps track of how many game numbers have been selected at block 570.

At block 576, the controller 100 (or one of the network computers 22, 32) may determine whether a maximum number of game numbers within the range have been randomly selected. If not, another game number may be randomly selected at block 570. If the maximum number of game numbers has been selected, at block 578 the controller 100 (or a central computer) may determine whether there are a sufficient number of matches between the game numbers selected by the player and the game numbers selected at block 570 to cause the player to win. The number of matches may depend on how many numbers the player selected and the particular keno rules being used.

If there are a sufficient number of matches, a payout may be determined at block 580 to compensate the player for winning the game. The payout may depend on the number of matches between the game numbers selected by the player and the game numbers randomly selected at block 570. At block 582, the player's cumulative value or number of credits may be updated by subtracting the bet made by the player and adding, if the keno game was won, the payout value determined at block 580. The cumulative value or number of credits may also be displayed in the display area 540 (FIG. 15).

Video Bingo

Figure 18:
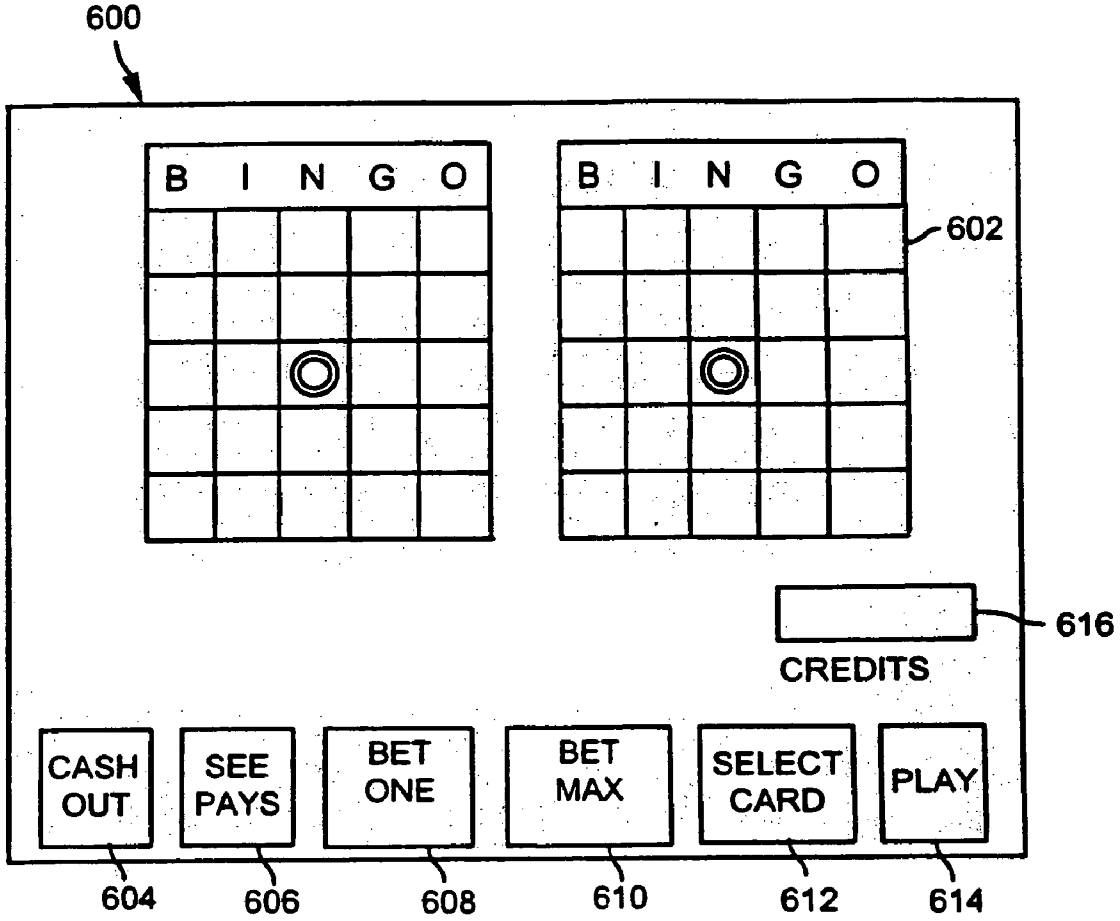
FIG. 18 is an illustration of an embodiment of a visual display that may be displayed during performance of the video bingo routine of FIG. 19.

FIG. 18 is an exemplary display 600 that may be shown on the display unit 70 during performance of the video bingo routine 250 shown schematically in FIG. 8. Referring to FIG. 18, the display 600 may include one or more video images 602 of a bingo card and images of the bingo numbers selected during the game. The bingo card images 602 may have a grid pattern.

To allow the player to control the play of the bingo game, a plurality of player-selectable buttons may be displayed. The buttons may include a "Cash Out" button 604, a "See Pays" button 606, a "Bet One Credit" button 608, a "Bet Max Credits" button 610, a "Select Card" button 612, and a "Play" button 614. The display 600 may also include an area 616 in which the number of remaining credits or value is displayed. If the display unit 70 is provided with a touch-sensitive screen, the buttons may form part of the video display 600. Alternatively, one or more of those buttons may be provided as part of a control panel that is provided separately from the display unit 70.

Figure 19:
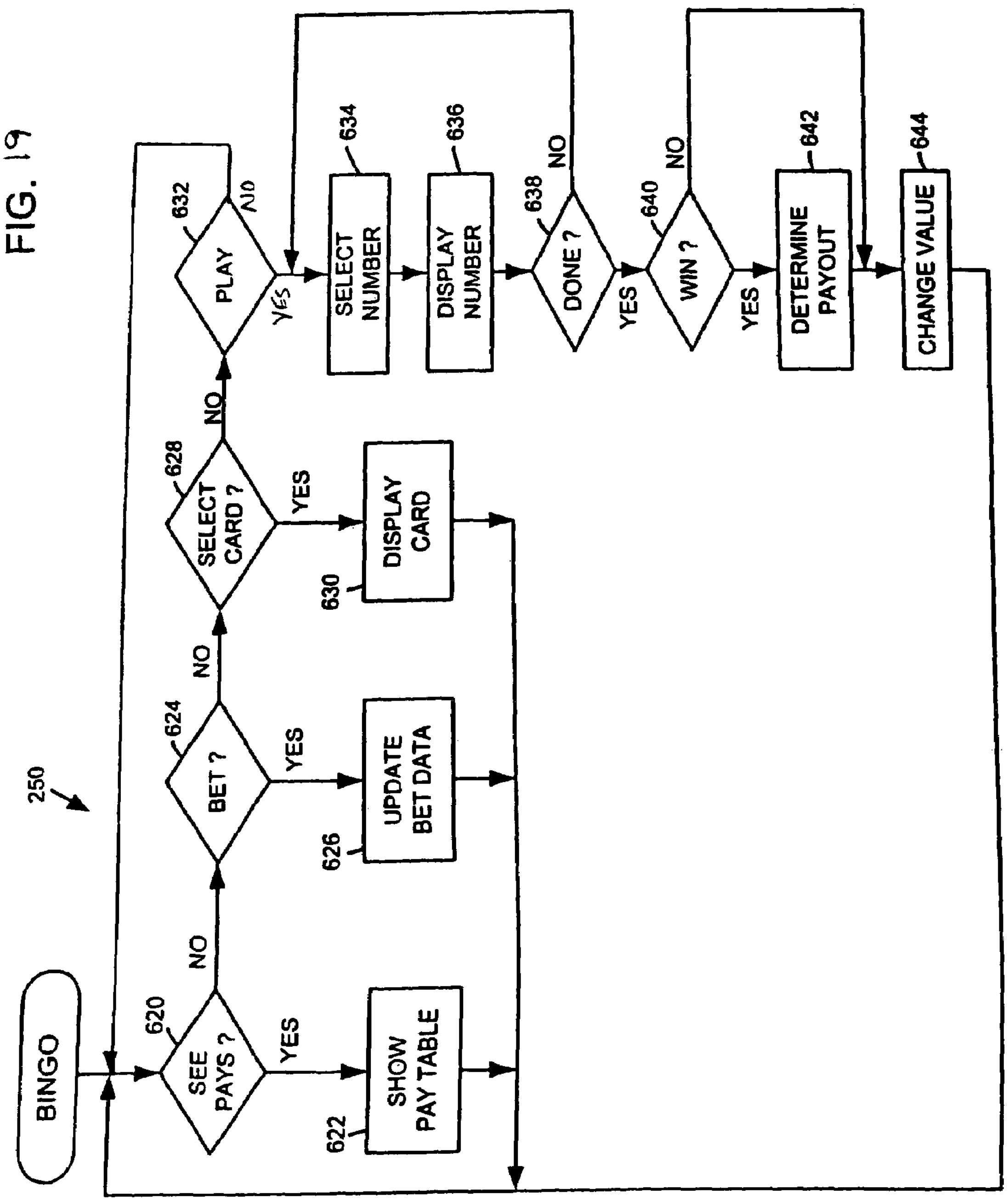
FIG. 19 is a flowchart of an embodiment of a video bingo routine that may be performed by one or more of the gaming units.

FIG. 19 is a flowchart of the video bingo routine 250 shown schematically in FIG. 8. The bingo routine 250 may be utilized in connection with a single gaming unit 20 where a single player is playing a bingo game, or the bingo routine 250 may be utilized in connection with multiple gaming units 20 where multiple players are playing a single bingo game. In the latter case, one or more of the acts described below may be performed either by the controller 100 in each gaming unit 20 or by one of the network computers 22, 32 to which multiple gaming units 20 are operatively connected.

Referring to FIG. 19, at block 620, the routine may determine whether the player has requested payout information, such as by activating the "See Pays" button 606, in which case at block 622 the routine may cause one or more pay tables to be displayed on the display unit 70. At block 624, the routine may determine whether the player has made a bet, such as by having pressed the "Bet One Credit" button 608 or the "Bet Max Credits" button 610, in which case at block 626 bet data corresponding to the bet made by the player may be stored in the memory of the controller 100.

After the player has made a wager, at block 628 the player may select a bingo card, which may be generated randomly. The player may select more than one bingo card, and there may be a maximum number of bingo cards that a player may select. After play is to commence as determined at block 632, at block 634 a bingo number may be randomly generated by the controller 100 or a central computer such as one of the network computers 22, 32. At block 636, the bingo number may be displayed on the display unit 70 and the display units 70 of any other gaming units 20 involved in the bingo game.

At block 638, the controller 100 (or a central computer) may determine whether any player has won the bingo game. If no player has won, another bingo number may be randomly selected at block 634. If any player has bingo as determined at block 638, the routine may determine at block 640 whether the player playing that gaming unit 20 was the winner. If so, at block 642 a payout for the player may be determined. The payout may depend on the number of random numbers that were drawn before there was a winner, the total number of winners (if there was more than one player), and the amount of money that was wagered on the game. At block 644, the player's cumulative value or number of credits may be updated by subtracting the bet made by the player and adding, if the bingo game was won, the payout value determined at block 642. The cumulative value or number of credits may also be displayed in the display area 616 (FIG. 18).

Video Pachinko

Figure 20:
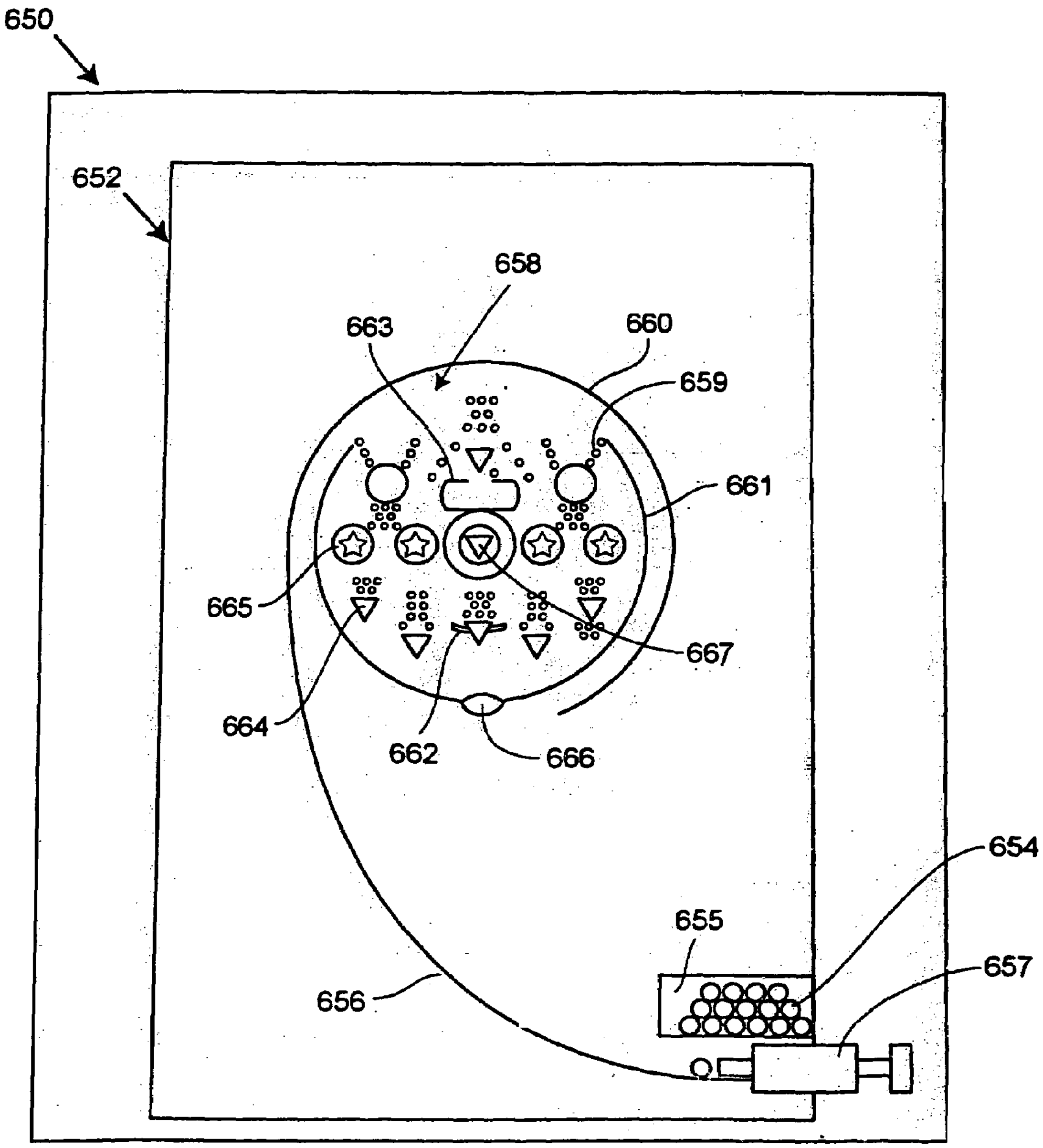
FIG. 20 is an illustration of an embodiment of a visual display that may be displayed during performance of the video pachinko routine of FIG. 21.

FIG. 20 is an exemplary display 650 that may be shown on the display unit 70 during performance of the video pachinko routine 252 shown schematically in FIG. 8. Referring to FIG. 20, the display 650 may include one or more video images of a pachinko board 652 and an image of a pachinko ball 654 used during the game. Typically, the video pachinko game outcome presentation on the display 70 may begin with the pachinko ball 654 from a ball reservoir 655 being placed on a ramp 656 in front of a plunger 657. The number of pachinko balls in the reservoir 655 may correspond to the number of credits a player has. Further, the number of credits represented by each ball may not be the same. For example, each ball may be color coded to represent a different wager amount. A silver ball might be worth 1 credit, a red ball might be worth 3 credits while a green ball might be worth 5 credits. The player may select a ball for a game from the ball reservoir 655 using gaming machine inputs including input buttons or a touch screen.

After a player selects a ball representing a certain wager amount and initiates a game play, the controller 100 may determine a game outcome and present a compatible game outcome presentation. On the display 70, a virtual plunger 657 may be drawn backward away from the ball 654 and then released. When the plunger 657 is released, it may move forward toward the ball 654 and may appear to strike the ball 654. After being hit by the plunger 657, the ball 654 may be launched up the ramp 656 into a game playing area 658. Typically, only one ball 654 may be launched up the ramp 656 at one time. However, two or more balls 654 may be launched at the same time, each ball 654 representing a different game with an independently calculated game outcome.

In the game playing area 658, balls 654 may appear to interact with different objects while falling through the game playing area 658 including pegs 659, an outer wall 660, and inner wall 661, flippers 662, bonus region separator 663, a cup 664, a spinner 665, and a ball exit 666. For example, when a ball 654 appears to collide with a peg 659, the trajectory of the ball 654 may be altered. Typically, the ball 654 may appear to collide with many different combinations of objects before exiting the game playing area 658. The exit of the ball 654 may correspond to the game outcome determined by the controller 100. For example, when the ball 654 exits the game playing area 658 through the ball exit 666, a player may lose the wager on the game. When the ball 654 exits the game playing area 658 through one of the cups 664 or the bonus region exit 667, the game outcome may be an award of some type.

Many other objects and exits are also possible with a pachinko game. These objects and exits may vary in size and location on the video display 70. Further, the distribution and number of objects on the video display 70 are not fixed and may be varied to change the game outcome presentation. However, the game outcome presentation does not affect the determination of the game outcome by the controller 100.

Figure 21:
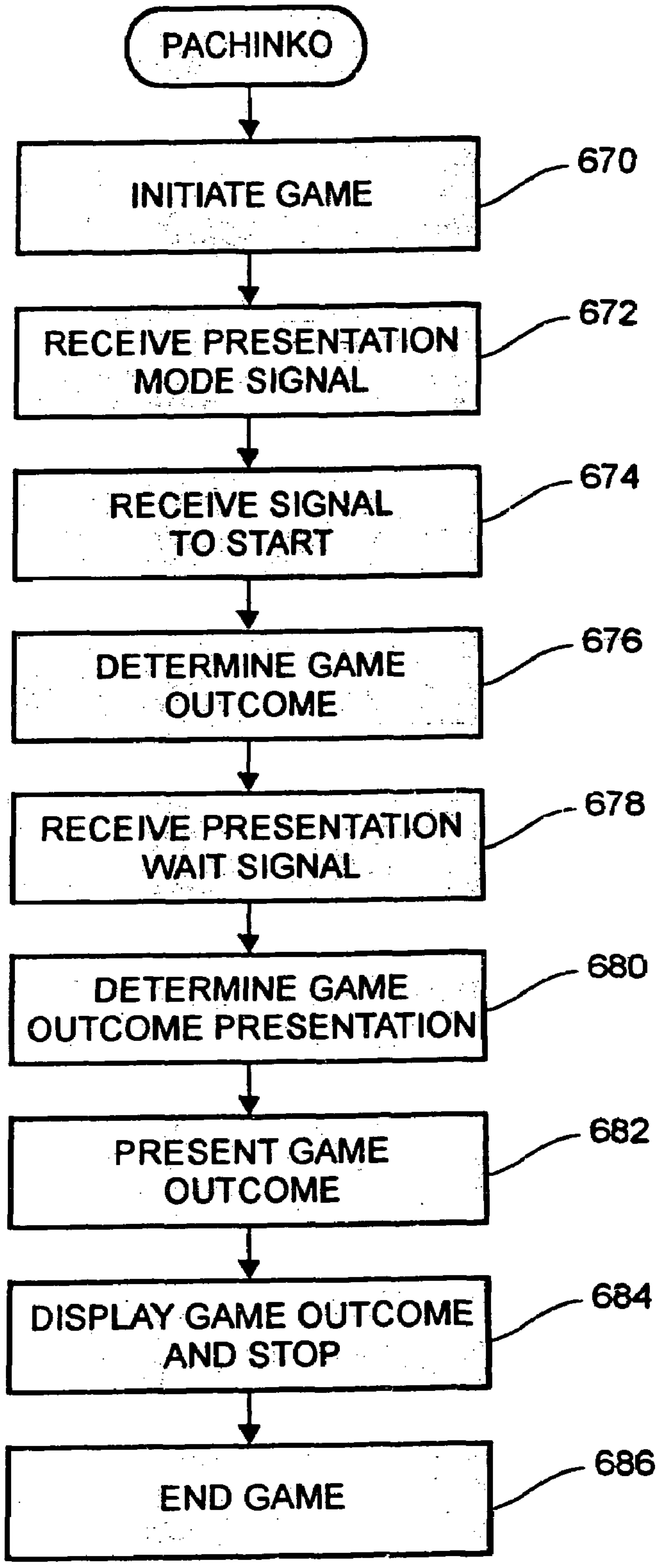
FIG. 21 is a flowchart of an embodiment of a video pachinko routine that may be performed by one or more of the gaming units.

FIG. 21 is a flow chart of the pachinko routine 252 shown schematically in FIG. 7. In a block 670, a player may initiate a game by making a wager. In a block 672, the controller 100 may receive a presentation mode signal. The presentation mode signal may carry information regarding selections by the player for one or more of the following game inputs including game speed, game background pattern, elasticity of the pachinko balls, size of the pachinko balls or the game layout. The controller 100 may use the presentation mode signal to determine features of a game outcome presented to the player. In block 674, the controller 100 receives a signal to start the pachinko gaming routine. In the block 676, the controller 100 determines a game outcome using a random number generator and a pay table stored within a memory in the gaming machine. The game outcome may be affected by the wager the player has made on this game and previous games or the number of game outcome presentations being presented such as a player playing multiple pachinko balls at one time.

In block 678, the controller 100 may receive a game presentation input signal. This signal may be used to determine the features of a game outcome presentation. For example, a game presentation input signal received by the controller 100 may contain information regarding the distance the player has moved a plunger away from a pachinko ball on the display screen 70. This distance may be used to generate or select a trajectory for a game outcome presentation. In block 680, the controller determines the game outcome presentation. The features of the game outcome presentation may depend on information from the presentation mode signal from block 672, the game outcome determined by the controller 100 in block 676, the information received from the presentation input signal in block 678 and information from previous game outcome presentations currently being presented on the display 70.

In block 682, after calculating an appropriate game outcome presentation for the game, the game outcome presentation is displayed on the display 70. In block 684, the game outcome is displayed on the display 70. The game outcome may be a message of some type containing information regarding whether the outcome of the game is an award of some amount or loss of the wager made on the game.

Although the above routine has been described as a virtual pachinko machine routine in which a pachinko board and pachinko balls are represented as images on the display unit 70, actual pachinko boards and pachinko balls capable of being manually manipulated may be utilized instead.

Hidden Image Game Routine

Figure 22:
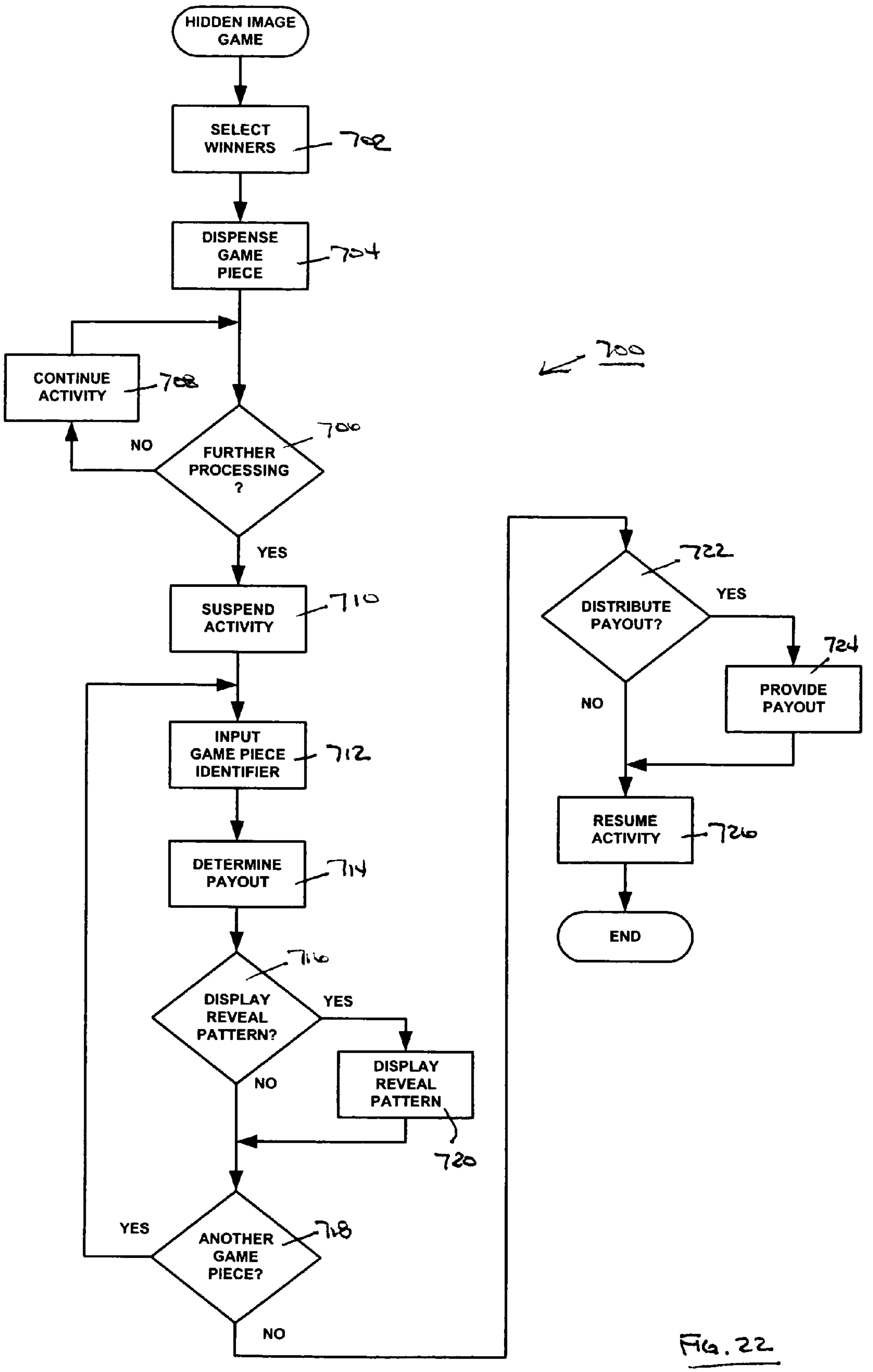
FIG. 22 is a flowchart of an embodiment of a hidden image game routine that may be performed by one or more of the gaming units in FIG. 1.

FIG. 22 illustrates a hidden image game routine 700 that may be used in place of or in combination with the game routines 210, 220, 230, 240, 250, 252, and 320 shown in FIGS. 7 and 8 and explained in greater detail with reference to FIGS. 9-20. That is, the routine 700 may be performed in place of the game routines 210, 220, 230, 240, 250, 252 in the main routine 200 of FIG. 7 or routine 320 in the alternate routine 300 in FIG. 8, or may be performed as a consequence of an occurrence of one or more events during the performance of the routines 210, 220, 230, 240, 250, 252, 320, such as in conjunction with bonus round play at block 496 of slots routine 230 as illustrated in FIG. 15, for example. More generally, the routine 700 may be performed as a consequence of an occurrence of one or more events during the performance of the routines 200, 300 or some other event.

The routine 700 may begin operation at a block 702, where those game pieces 128 designated as "winning" game pieces (those game pieces associated with a payout) may be selected by the game system 120. For example, where the game pieces 128 have a preprinted hidden image 130 thereon which will indicate to the player that the game piece 128 is a winning game piece (e.g., "YOU WIN!!!"), the game piece identifiers 132 of the game pieces 128 having the appropriate hidden image 130 may be loaded into memory, for example the memory 102, 106 associated with the controller 100. Alternatively, where the hidden images 130 are not preprinted, but added to the game pieces 128 through the use of the printer 172 associated with the game piece dispenser 122, the controller 100 may select certain game piece identifiers 132 of game pieces 128 that will be "winning" game pieces 128, and print the appropriate hidden image 130 on the game piece 128 as the dispenser 122 indexes through the game pieces 128 loaded into the hopper 170. As a further alternative, the selection may occur at the network computer 46, which may be a game piece server, and the network computer 46 may control the game piece dispenser 122, either directly or indirectly through the controller 120, to print game pieces 128 with hidden images 130 and game piece identifiers 132 in accordance with the game pieces 128 selected by the network computer 46 as the "winning" game pieces.

It will be recognized that the selection of winning game pieces 128 need not occur at the very beginning of the routine 700, as illustrated in FIG. 22. To the contrary, particulary in those cases where the game piece dispenser 122 is equipped with a printer 172 so as to be able to define the hidden images 130 (and game piece identifier 132) associated with the game pieces 128 at the time the game pieces 128 are dispensed, the selection of "winning" game pieces 128 may be delayed until the game piece 128 is actually dispensed from the game piece dispenser 122. In fact, in an embodiment wherein a number of game pieces 128 bear a common hidden image 130, but only one of the game pieces 128 is identified as the "winning" game piece according to its associated unique game piece identifier 132, the selection of the "winner" may be delayed until the game piece identifier 132 associated with the game piece 128 is entered into the game system 120 through the use of the game piece identification device 124. That is, at the time the game piece identifier 132 is received by the system 120, the system 120 (whether the network computer 46 or the controller 100, for example) may subject the game piece identifier to an algorithm that determines if the game piece 128 associated with the game piece identifier 132 should be selected as the "winning" game piece.

The routine 700 may continue to a block 704, where the controller 100 may cause the game piece dispenser 122 to provide a game piece 128 to the player. The controller 100 may be programmed to cause the game piece dispenser 122 to provide the game piece 128 in response to one or more events that occur during the performance of the main routines 200, 300, the game routines 210, 220, 230, 240, 250, 252 or some other event. Examples of such events include game play events (e.g., a particular combination of game elements, a particular series of combinations of game elements, a bonus round trigger event, a progressive level trigger event), player tracking events (e.g., card-in, elapsed gaming time, number of coins in or out, rate of coins in or out), timed events (e.g., at a particular time of the day, on a particular day of the year, at a predetermined time, at a randomly selected time) and promotional events (e.g., to encourage use of underutilized machines, to encourage participation in a tournament). Alternatively, rather than the controller 100 being programmed to cause the game piece dispenser 122 to provide the player with a game piece 128, the game piece dispenser 122 may provide the piece in response to a signal transmitted by the network computer 22, 32, 46. As a further alternative, an employee of the casino, gaming establishment, or gaming system operator may provide a game piece 128 to the player separate and apart from the operation of the gaming units 20, 30, for example, as part of a promotional event or a direct mailing campaign.

Moreover, more than one game piece 128 may be dispensed to the player in response to one or more events that occur during the performance of the main routines 200, 300, the game routines 210, 220, 230, 240, 250, 252 or some other event. As one such example, a plurality of game pieces 128 may be secured or bound together and provided together to a player, for example in the form of a book. Such a book of game pieces 128 may be dispensed to the player in response to a bonus event or a promotional event, or may be purchased by the player. As one example, a casino operator may dispense a book of game pieces 128 to a player as the player leaves an entertainment venue, such as a showroom or theater, to encourage the player to return for further game play when the player may otherwise retire to his or her room for the evening. As another example, the casino operator may mail the book of game pieces 128 to the player according to player tracking information associated with the player, and/or the number of game pieces 128 in the book may vary according to player tracking information associated with the player. The value associated with the each of the game pieces 128 may vary, or a such that some may game pieces may have high value payouts associated therewith, while other game pieces may have low value payouts associated therewith.

Once the game piece 128 has been dispensed to the player, the routine may determine at block 706 if an event has occurred which will cause the controller 100 to continue with further processing of the game piece, e.g., to activate the game piece identification device 124, to activate the hidden image revealer 126 (if required by the type of game piece 128 involved), etc. In some instances, the same event that caused the controller 100 to cause the game piece dispenser 122 to provide the game piece 128 to the player will cause the controller 100 to process the game piece 128 further. For instance, if the game piece 128 is provided as part of a bonus round event, the controller 100 may cause the game piece dispenser 122 to provide the game piece 128 to the player and then activate the game piece identification device 124 and the hidden image revealer 126 immediately thereafter or concurrently therewith. On the other hand, the further processing may be delayed for a period of time for any one of a number of reasons.

For example, further processing may be delayed until the player elects to proceed with further processing, until a particular time of day, or until the player has wagered a specific amount or played the gaming unit 20, 30 for a specific amount of time. As a further example, further processing may be delayed to give the player a certain amount of time to find a particular gaming unit 20, 30 or kiosk 36, 49 and perhaps perform one or more actions at the gaming unit 20, 30 or kiosk 36, 49. As a still further example, further processing of the game piece 128 may require interaction with a gaming operator employee, which may be part of the goal of certain promotions with which the gaming system 120 may be used. That is, certain gaming operator employees may be equipped with PDAs or laptops that may be connected to the game system 120 by a wireline or wireless connection and that may be used, for example, as the hidden image revealer 126 and/or the game piece identification device 124. After the game piece 128 has been distributed to the player, further processing of the game piece 128 may be deferred until the player can locate and interact with one of these gaming operator employees to determine whether their game piece 128 is a winning game piece. As yet another, alternative, further processing may be deferred until the player uses his or her own PDA, laptop or personal computer, for example at home or in the privacy of their own hotel room, to determine if the game piece 128 is a winning game piece.

If the event that further processing is delayed, then the routine 700 continues the activity of the gaming unit 20 (game play, for example) at block 708 until such time as the other event occurs. Periodic checks may be made for the other event, and when the other event occurs, the routine may continue to block 710 and may suspend the other activity of the gaming unit 20 (game play, for example) while the remaining operations of the routine 700 are carried out. Alternatively, the routine 700 may proceed directly to block 712 without suspending the activity of the gaming unit 20. For example, where the display unit 70 is used as the hidden image revealer 126, the other activity of the gaming unit 20 may be suspended at block 710; where a display associated with the player tracking module 60 is used as the hidden image revealer 126, the other activity of the gaming unit 20 may not be suspended, and the routine 700 may proceed to block 712.

At the block 712, the controller 100 may use the game piece identification device 124 to determine the identity of the game piece 128. In particular, where the game piece identifier 132 includes a combination of alphanumeric symbols, a game piece identification device 124 such as the control panel 66 may be used. Alternatively, where the game piece identifier 132 is in primarily machine-readable form (e.g., bar code), the game piece 128 may be placed adjacent to a scanner or sensor (e.g., bar code scanner) such that the game piece identifier 132 may be read. This activity may occur with the cooperation of the hidden image revealer 126 where the hidden image 130 includes the game piece identifier 132. The game piece identification device 124 may then generate and transmit an electronic signal representative of the game piece identifier 132 to the controller 100. The controller 100 may be programmed to receive the signal and identify the game piece 128 according to the signal received.

Once identified, the controller 100 may be programmed to determine the value payout associated with the game piece 128 at a block 714. In one embodiment, each game piece 128 may have an unique game piece identifier 132, and the controller 100 may compare the identifier to a set or a list of valid game piece identifiers stored by the gaming unit 20 or the gaming system 10, or the controller 100 may utilize an algorithm to decode the game piece identifier 132 and determine the value payout. In another embodiment, the game piece identifier 132 may be a non-unique identifier, in which case the non-unique identifier may indicate one payout selected from a set of payouts, each payout associated with one of a plurality of non-unique identifiers. After making this determination, the routine 700 continues to block 716.

At block 716, the controller 100 determines, according to the type of game piece 128 used, if the hidden image revealer 126 should be activated. Some types of game pieces 128, such as the scratch-off or pull-tab game pieces 128 shown in FIGS. 5 and 6, do not require the hidden image revealer 126 to be activated to reveal the hidden image 130, and the routine proceeds to block 718. If, however, the game piece 128 is similar to those illustrated in FIG. 4, the controller 100 activates the hidden image revealer 126 at block 720. For instance, the controller 100 may cause the display unit 70 (which may be used as the hidden image revealer 126) to generate a pattern in a color that is complementary to the colored ink used in a concealing image 140 of a game piece 128 according to the embodiment shown in FIGS. 4A and 4B. When the player (or an employee of the casino/gaming establishment/game system operator) holds the game piece up to the display unit 70 providing the colored pattern, the hidden image 130 may be revealed in a form that is readable or detectable by the player, by the gaming unit 20, or both. If the activity of the gaming unit 20 is temporarily suspended during this time, the controller 100 may be programmed to activate the hidden image revealer 126 only for a limited period of time, which may be at the discretion of the operator of the gaming system 10. In this way, the likelihood of a prolonged suspension of game play may be reduced.

The routine 700 may continue to block 720, where the controller 100 determines whether the player has additional game pieces 128 to be processed. For example, the controller 100 may cause the display unit 70 to generate a message requesting the player to press one of the buttons on the control panel 66 if the player has additional game pieces 128 to be processed. If the player has additional game pieces 128, the routine returns to block 712; otherwise, the routine proceeds to block 722.

As one example of an instance where the player may have more than one game piece 128, the player may have a game piece 128 that has multiple hidden images 130, 131 and multiple identifiers 132, 133 associated with the hidden images 130, 131, as shown in FIGS. 7A and 7B. In this instance, the player may reveal the first hidden image 130 and enter the identifier 132 for the first hidden image 130 (blocks 712, 714, 716, 720), indicate to the gaming unit 20 that he or she has another game piece 128 (block 718) and then reveal the second hidden image 131 and enter the identifier 135 for the second hidden image 131 (blocks 712, 714, 716, 720).

Figure 23:
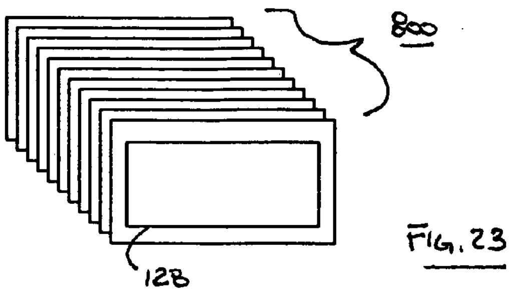
FIG. 23 is an illustration of a set of game pieces.

As a further example, as illustrated in FIG. 23, over time a player may collect a set 800 of game pieces 128. While a set 800 including twelve game pieces 128 is illustrated, the set 800 could include more game pieces 128 or as few as one game piece 128. Here as well, the player may indicate at block 720 that he or she wishes to repeat the steps of blocks 712, 714, 716, 720 each time for a different one of the game pieces 128 of the set 800 of game pieces 128.

In fact, the game system 120 may determine the payout (at block 714) based on the set 800 of game pieces 128, when considered as a whole or collectively, rather than on the basis of any particular game piece 128 when considered individually. In this regard, two embodiments of game sets 800 are illustrated in FIGS. 24 and 25, and are explained in greater detail below.

Figure 24:
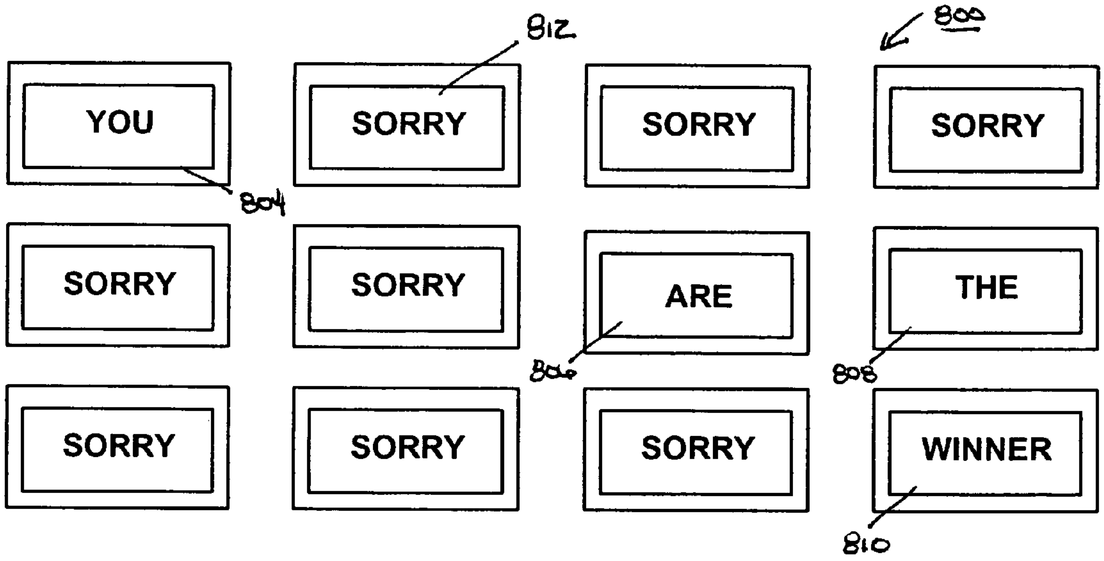
FIG. 24 is a plan view of the set of game pieces illustrated in FIG. 23 according to an embodiment.

According to the embodiment of the set 800 shown in FIG. 24, the player may be required to collect a particular group of game pieces 804, 806, 808, 810 before a payout is awarded to the player. Other game pieces 812 may be distributed, but may not be associated with a payout, or may not be associated with the payout that is awarded if the game pieces 804, 806, 808, 810 are collected. Moreover, a payout may not be awarded if the player has only collected some of the game pieces of the group, for example, game pieces 804 and 806.

As illustrated in FIG. 24, each of the game pieces 804, 806, 808, 810 associated with the group may each represent a part of an assembly, which assembly further reinforces the cooperative nature of the group in participating in the payout determination. For example, as indicated in FIG. 24, the group of game pieces 804, 806, 808, 810 may be assembled to collectively form the phrase "YOU ARE THE WINNER." Alternatively, the group of game pieces 804, 806, 808, 810 may be assembled to collectively define an icon, logo or picture, such as that of a mascot for a casino or gaming establishment. Still other possibilities are within the scope of this disclosure.

Figure 25:
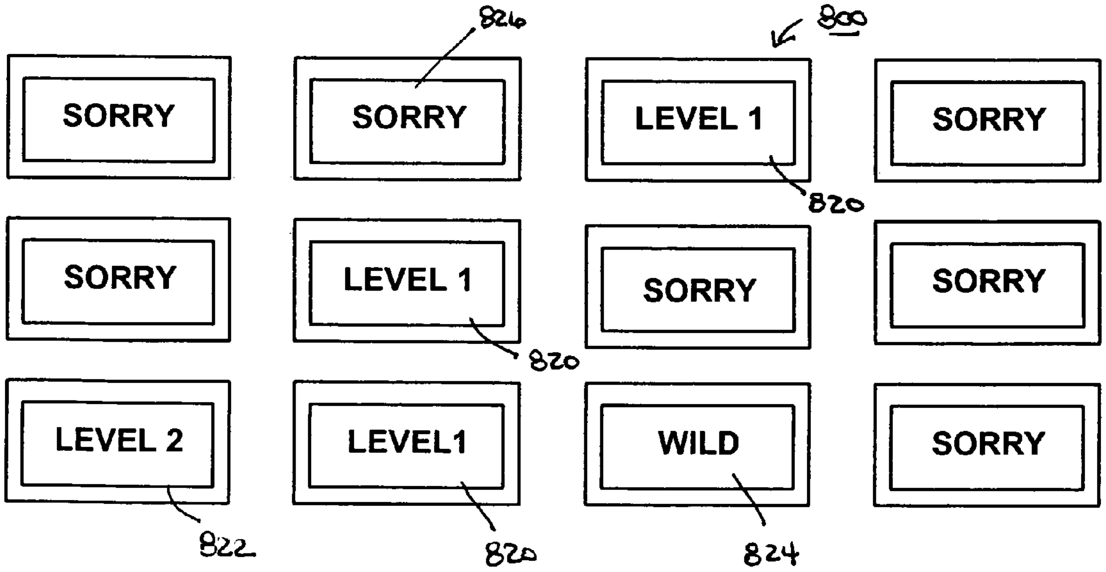
FIG. 25 is a plan view of the set of game pieces illustrated in FIG. 23 according to another embodiment.

Another alternative is shown in FIG. 25, wherein the set 800 may be used in conjunction with a prize structure having various prize levels. The game pieces 820, 822, 824 may be associated with one or more of the prize levels. In particular, as shown, the game pieces 820 may be associated with a first prize level ("Level 1"), the game pieces 822 may be associated with a second prize level ("Level 2"), and the game pieces 824 may be associated with the first, second, and other prize levels ("Wild"). Other game pieces 826 of the set 800 may be associated with none of the prize levels.

According to this embodiment, the player may be required to collect a certain number of game pieces identified with a prize level to receive a prize from that prize level. Moreover, the number of game pieces that a player is required to collect to receive a prize from a given level may be related to the value of the prizes associated with that prize level. For example, using the game pieces illustrated in FIG. 25, as explained above, the second prize level may have prizes associated therewith that are more expensive (associated with a larger amount of value) than the prizes associated with the first prize level, the third prize level more expensive than the second prize level, and so on. Accordingly, the player may only be required to collect one game piece 820 to receive a prize from the first prize level, but the player may be required to collect two game pieces 822 to receive a prize from the second prize level. Alternatively, the player may be permitted to collect game pieces from different prize levels to receive a prize from one of the levels; that is, a player may collect two game pieces 820 and one game piece 822 to receive a prize from the second prize level. Additionally, a "wild" game piece 824 may be combined with any of the other game pieces 820, 822 to meet the number of game pieces required to collect a prize from that level.

Furthermore, the player may be required to collect a certain number of game pieces 820, 822, 824 to advance to the next prize level, whereupon the player may receive a prize from that prize level. However, there may be a greater number of game pieces available at the lower prize levels to compensate for the fact that a greater number of game pieces may need to be collected to advance to the higher prize levels. For example, the player may be required to collect three game pieces, 820 to advance to the second prize level, to collect two game pieces 822 to advance to the third prize level, and so on. Here as well, the "wild" game piece 824 may be combined with the game pieces 820, 822 such that the collective number of game pieces 820, 822, 824 is sufficient to advance to the next prize level. Until a player advances to the next prize level, however, the game pieces associated with that prize level may not be used to receive a prize from that prize level.

At block 722, the controller determines if the type of payout determined should be dispensed to the player before permitting further game play to proceed, or whether the player should be given the option of delaying dispensing of the payout and/or whether the payout should be automatically transferred to, the player's amount, for example, for use in further game play. This determination may depend on the type and/or amount of the payout to be dispensed. For example, the value may be dispensed in the form of additional gaming credits, extended play time, player tracking points, rewards points (e.g. for airline travel), currency, a voucher or ticket, stored value in the form of token or on a smart card, and goods or services. Also, certain payouts and payout levels may require verification (for example, of the age, etc. of the player or the game piece identifier 132, etc. of the game piece 128) and reporting (for example to taxing and gaming authorities) by the operator of the gaming system 10. If the payout is to be dispensed before game play proceeds, the routine 700 proceeds to block 724. In the alternative, the routine proceeds to block 726, and the controller lifts the suspension of other activity, and the other suspended activity of the gaming machine 20, 30 resumes.

The routine 700 may now be further explained by way of a first illustration.

According to the illustration, an embodiment of the gaming system 120 may include a game piece dispenser 122 that dispenses game pieces 128 of the type illustrated in FIGS. 4A and 4B. The game piece dispenser 122 may include the printer 172, such that the game pieces may be formed from blanks loaded into the hopper 170 that do not, at the time the blanks are loaded into the hopper 170, have the hidden image 130 formed on the substrate 138 of the game piece 128. Furthermore, according to this illustration, each game piece 128 may have only one hidden image 130 defined thereon, and one or more of the game pieces 128 may be selected to be a winning game piece uniquely identified relative to the remainder of the game pieces 128 dispensed. Moreover, according to the embodiment discussed in this illustration, the game piece identification device 124 is a bar code reader and the hidden image revealer 126 may be the display unit 70.

At block 702, the network computer 46 selects one or more game piece identifiers 132 to be associated winning game pieces to be distributed to players as part of a player tracking program, for example, as part of a player tracking promotional program. The network computer 46 may also select one or more game piece identifiers to be associated with non-winning game pieces to be distributed other players as part of the player tracking program. The winning and non-winning game piece identifiers 132 may be distributed at random to the players already having identified themselves as participants of the player tracking program, for example, by entering an identifier on a keyboard associated with the player tracking module 60, or by entering a card into the card reader 58 associated with the player tracking module 60. As one alternative, the winning and non-winning game piece identifiers 132 may be associated with particular player tracking accounts, and the game system 120 may delay distribution of the game piece identifiers 132 until the players associated with these player tracking accounts identify themselves as present at one of the gaming units 20, 30.

With the game piece identifier 132 distributed to the gaming units 20, 30 and in particular to the game dispenser 122, the game piece dispenser 122 prepares and dispenses the game piece 128 to the player at block 704. According to this illustration, the game piece dispenser 122 forms a hidden image 130 that is representative as to whether the game piece identifier 132 has been associated with a winning or non-winning game piece 128. For example, the hidden image 130 for a winning game piece may be "YOU WIN!!!", while the hidden image 130 for a non-winning game piece may be "SORRY, TRY AGAIN." The game piece dispenser 122 forms this hidden image 130 on the substrate 138 by printing the hidden image 130 using ink of a first color. The game piece dispenser. 122 then forms the concealing image 140 over the hidden image 130. The game piece dispenser 122 also prints the game piece identifier 132 on the game piece 128, for example, in the form of a bar code. The game piece dispenser 122 then dispenses the game piece 128 to the player, and this may be announced to the player via a message displayed on a display unit associated with the player tracking module 60 or a message generated over the speakers 62.

According to this illustration, the routine 700 may pass to block 706, and at block 706 it may be determined that further processing will be delayed until a minimum amount has been wagered. Consequently, the routine 700 may pass to block 708, wherein further processing is delayed and the gaming unit 20 operates according to its normal function (e.g., game play). When the minimum amount has been wagered, the routine 700 may pass to block 710, wherein the normal operation of the gaming unit 20 is suspended, and then to block 712, wherein the game piece identifier 132 is entered by scanning the game piece 128 with the game piece identification device 124.

Given that the gaming unit 20, 30 and the game system 120, may be aware of the identity of the game piece 128, before the player may be aware of whether the hidden image 130 shows that he or she is a winner or not, it may be possible for the gaming machine 20, 30 and the game system 120, to take certain actions in anticipation of the outcome. For example, the controller 100 may lock down the gaming unit 20, 30 if the game piece 128, and more particularly the game piece identifier 132, is associated with a payout. Alternatively, the controller 100 may activate the speakers 62 to provide music to heighten the suspense or to suggest a winning outcome. The controller 100 may also activate bezel lights, back lights, etc. to heighten the suspense or to suggest a winning outcome. Further, the player tracking module 60 may control associated lights to reinforce the mood, or associated displays to provide messages to add to the excitement (e.g., "LET'S SEE IF YOU'RE A WINNER!"). The routine 700 also continues on to block 714, where a determination may be made to determine if the game piece 128 identified at block 712 is a winning game piece, such that a payout should be provided.

The routine then proceeds to block 716, wherein a determination may be made as to whether the hidden image revealer 126 (display unit 70) should be activated. Given that the game piece 128 is of the type illustrated in FIGS. 4A and 4B, the determination may be made that the hidden image revealer 126 should be activated, and the routine proceeds to block 720. According to this illustration, the controller 100 may control the display unit 70 to generate a pattern of a color complementary to that of the concealing image 140, such that when the game piece 128 is placed adjacent to or on the screen of the display unit 70, the hidden image 130 is revealed.

The routine 700 may then continue to block 718, wherein the controller 100 determines if the player has additional game pieces 128. Where the player has no additional game pieces, the routine 700 may continue to block 722, wherein the controller 100 determines if the payout of the prize should be distributed. For example, as noted above, certain prizes may require validation of the player and/or the game piece, as well as preparation of paperwork for gaming and/or taxing authorities. In the case where the further processing is occurring at a gaming machine 20, 30, the routine 700 may proceed to block 724, and the controller 100 may lock down the gaming unit 20, 30 to prevent further game play until the payout is provided. In another case where the player is determining if the game piece 128 is a winning game piece at a location remote from the casino (e.g. in his or her hotel room or at home), then the routine 700 may proceed to block 724 and require the player to verify his or her identity (e.g., using biometric identification) and his or her location (e.g., with GPS or other location information). As another alternative, the player may desire to receive the payout immediately, instead of waiting until game play is complete; in this instance as well, the routine 700 may proceed to block 724, wherein the payout is provided without further delay.

As a further alternative, in proceeding to block 724, the routine 700 may direct the player to one or more third-party vendor websites, where the player may redeem his or her winning game piece for one or more prizes offered by the third-party vendor. That is, the routine 700 may access a third-party vendor website when one or more winning game pieces 128 are presented, or the routine 700 may provide the player with access to a plurality of third-party vendor websites, the selection of the particular website to be selected left to the discretion of the player. Furthermore, the winning game piece or pieces may be associated with a particular prize for which the card may be redeemed, or a group of prizes from which the player may select one or more prizes or have one or more prizes selected for him or her according to a profile associated with his or her player tracking account, or a particular number of prize points that the player may used to "purchase" one or more goods and/or services from the third-party vendor, the goods and/or services having a "cost" in prize points associated therewith and the cost of the goods and/or services selected deducted from the particular number of prize points associated with the player. In fact, in the case where the goods and/or services may be "purchased", the player's player tracking account may be used to establish a prize point account, much like a bank account, to which the player may add or deduct prize points over time. The player may then arrange with the third-party vendor for shipping to the location of the player's choosing, or that information may be available to the third-party vendor by virtue, for example, of such information being associated with the player in the casino operator's player tracking system.

As a specific example, a particular slot machine may have a motorcycle game theme. In conjunction with a particular combination of reel symbols, a game piece 128 may be distributed. Upon further processing, the game system 120 may determine that the game piece 128 is a winning game piece, and that a particular prize, a leather motorcycle jacket, is associated with the winning game piece. The game system 120 may direct the player to a third-party vendor website, such as the website of a leather goods retailer that sells leather motorcycle-style jackets or of a motorcycle retailer that sells leather jackets bearing the trademark of their particular motorcycles. The third-party vendor website would honor the winning game piece, and provide to the player the leather motorcycle jacket associated therewith. The player could then direct the third-party vendor to ship the jacket to a location of the player's choosing, or to a location associated with the player's player tracking account, which information is provided by the casino operator to the third-party vendor at the player's request.

On the other hand, the payout may be in a form that can be or is intended to be received only after another event occurs. For example, the payout may be in the form of credits to be used on the game, in which case the player may decide to use the credits instead of take an immediate payout of the value represented by the credits. Alternatively, the prize may be in the form of credits, which the player will receive only after they have wagered a like number of credits or some lesser number (e.g., half of the credits to be provided as a payout). In either event, the routine 700 would proceed in this case to block 726, and the controller 100 would permit the gaming unit 20 to resume its normal operation.

The routine 700 may now be further explained by way of a second illustration.

According to this illustration, the game piece 128 may be distributed via a game dispenser 122, as discussed in the first illustration, or the game piece 128 may be dispensed using some other mechanism. For instance, the game piece 128 may be dispensed by employees of the gaming system operator. Whatever the mechanism by which the game piece 128 is dispensed, the game piece may have information (including the identifier 132) disposed thereon in a machine-readable form such that it may be read by the ticket printer reader 56, which according to this illustration functions as the game piece identification reader 124. Moreover, according to this illustration, the game piece 128 may have a value that is not associated with the game piece 128 at the time the game piece 128 is dispensed to the player. Instead, the gaming unit 20 or the game piece server 46 determines the payout when further processing occurs. Thus, block 702 may be omitted from the routine 700 according to this illustration.

Instead, the routine 700 begins at block 704, and the game piece 128 is dispensed to the player, either using the game piece dispenser 122 or by a casino operator employee, for example as part of a promotional event. At block 706, further processing of the game piece 128 may be delayed (causing the routine to pass to block 708) until such time as the player having the game piece 128 inserts a player tracking card into the card reader 58, which card reader 58 may be associated with a player tracking module associated with the gaming unit 20 (a player tracking event). The operation of the gaming unit 30 may then be suspended at block 710, as the routine 700 continues on to block 712.

As noted above, according to this illustration, the game piece 128 is received into the ticket printer/reader 56, and the machine-readable information (including the identifier 132) on the game piece 128 is inputted at block 712. The gaming unit 20, 30 or one of the network computers 46, operating as a game piece server, then uses;the identifier 132 to determine the payout, for instance through the generation of a random or pseudo-random number based on the identifier 132. In fact, the gaming unit 20, 30 or the network computer/game piece server 46 may generate a new random or pseudo-random number every time the routine 700 reaches the block 714 by virtue of the fact that the game piece 128 has been inserted into the ticket printer/reader 56 and the player tracking card has been inputted into the card reader 58. The routine then proceeds to blocks 716, 720, wherein a reveal pattern is generated on the display unit 70 of the gaming unit 20.

As the value of the game piece 128 is not determined until the game piece identifier 132 is inputted into the game piece system 120, the hidden image 130 may be non-committal in regard to the value associated therewith; for example, the hidden image 130 may be the message "YOU MAY BE A WINNER!" Alternatively, certain game piece identifiers 132 may be associated with "winning" game pieces 128, even though the exact nature of the payout may not be determined until after the game piece 128 is inserted into the ticket printer/reader 56 and the player inserts his or her player tracking card into the card reader 58. In such a circumstance, the message may be "WINNER!" As a further alternative, the hidden image 130 may provide an indication of a characteristic of the payout awarded; for instance, where the payout is a multiplier that is good over multiple plays of a game for a single day, the hidden image 130 may be the message "GOOD ALL DAY FOR POKER PLAY!"

Because the hidden image 130 does not provide an indication of the exact nature of the payout, the gaming unit 20, 30 or network computer/game piece server 46 may control a display associated with the gaming unit 20, 30 to display an indication of the payout determined. As a specific example, it may be determined at block 714 that the payout is an enhancement of payouts that occur if particular combinations occur during play of the game (e.g., a payout for four kings is multiplied by a factor of 2 if four kings occur in a five-card poker hand). The controller 100 may cause a display unit associated with the player tracking module, for example, to display a message indicative of this fact, such as "Double Payout for Four Kings." In this manner, the player may be informed of the payout associated with the game piece 128.

Given that the payout in this illustration is a multiplier to be associated with payouts determined according to particular combinations of cards in a hand of poker, the distribution of this payout may be determined to occur immediately at block 722, the distribution occur at block 724, and normal activity (except for the multiplier as to payouts for particular combinations) to occur at block 726. If the player were to remove the game piece 128 and his or her player tracking card from the gaming unit 20, 30, and move to a different gaming unit 20, 30, the routine would begin again at block 706, and a different payout may be determined at block 714, for instance a different enhancement for a different hand (e.g., 10 extra credits for two pairs).

What is claimed is:

1. A gaming method for a gaming system including a plurality of instructions, the gaming method comprising:
- receiving a first wager on a first play of a game;
- causing a display unit to generate an image representative of the game;
- causing at least one processor to execute the plurality of instructions to determine an outcome of the first play of the game represented by the image;
- causing the at least one processor to execute the plurality of instructions to determine a first payout according to the outcome of the first play of the game and the first wager of the first play of the game;
- dispensing a physical game piece associated with at least one identifier if the at least one first trigger event has occurred, the physical game piece including at least one hidden image based on the outcome of the first play of the game and at least one concealing image disposed thereon, the at least one concealing image limiting the visibility of the at least one hidden image;
- after dispensing the physical game piece, receiving a second wager on a second, subsequent play of the game;
- causing the at least one processor to execute the plurality of instructions to determine if a second trigger event has occurred based on an outcome of the second play of the game;
- if the second trigger event has occurred, causing the at least one processor to execute the plurality of instructions to cause an identification input device to receive the at least one identifier associated with the physical game piece resulting from the first play of the game;

causing the at least one processor to execute the plurality of instructions to determine a second payout according to the at least one identifier; and causing the display unit to display a reveal pattern based on the second trigger event such that when the physical game piece is placed adjacent to the display unit, the reveal pattern cooperates with the at least one concealing image of the physical game piece to make the at least one hidden image visible.

2. The method of claim 1, further comprising:

causing the at least one processor to execute the plurality of instructions to determine if a plurality of first trigger events have occurred for a plurality of outcomes of a plurality of plays of the game; and dispensing a plurality of physical game pieces if the plurality of first trigger events have occurred, each of the plurality of physical game pieces including at least one identifier associated therewith, at least one of the physical game pieces being dispensed according to the occurrence of one of the plurality of the first trigger events, and each of the plurality of physical game pieces having at least one hidden image and at least one concealing image disposed thereon, the at least one concealing image limiting the visibility of the at least one hidden image.

3. The method of claim 2, further comprising:

causing the at least one processor to execute the plurality of instructions to cause the identification input device to receive the plurality of identifiers associated with the plurality of physical game pieces; and causing the at least one processor to execute the plurality of instructions to determine the payout according to the plurality of identifiers.

4. The method of claim 2, further comprising:

causing the at least one processor to execute the plurality of instructions to cause the identification input device to receive a subset of the plurality of identifiers associated with the plurality of physical game pieces; and causing the at least one processor to execute the plurality of instructions to determine the payout according to the received subset of the plurality of identifiers.

5. The method of claim 4, wherein each of the plurality of physical game pieces associated with the plurality of identifiers includes a hidden image, and wherein the plurality of hidden images collectively define at least one selected from the group consisting of: a composite image and a phrase.

6. The method of claim 1, wherein the at least one first trigger event includes at least one selected from the group consisting of: a game play event, a player tracking event, a time event, and a promotional event.

7. The method of claim 6, wherein the game play event includes at least one selected from the group consisting of: a particular combination of game elements, a particular series of combinations of game elements, a bonus round trigger event, and a progressive level trigger event.

8. The method of claim 6, wherein the player tracking event includes at least one selected from the group consisting of: a card-in event, an elapsed gaming time, a number of coins in, a number of coins out, a rate of coins in and a rate of coins out.

9. The method of claim 6, wherein the time event includes at least one selected from the group consisting of: a particular time of day, a particular day of a year, a predetermined time, and a randomly selected time.

10. The method of claim 6, wherein the promotional event includes at least one selected from the group consisting of: an event to encourage use of underutilized machines and an event to encourage participation in a tournament.

11. The method of claim 1, wherein causing a display unit to display the reveal pattern includes emitting a colored light that cooperates with the concealing image to make the hidden image visible.

12. A gaming system comprising:

at least one display unit;

a game piece dispenser configured to dispense a game piece having at least one hidden image and at least one concealing image disposed thereon, the at least one concealing image limiting visibility of the at least one hidden image;

an identification input device; and a controller operatively coupled to the at least one display unit, the game piece dispenser, and the identification input device, the controller programmed to:

receive a first wager on a first play of a game;

cause the at least one display unit to generate an image representative of the first play of the game;

determine an outcome of the first play of the game represented by the image;

determine a first payout based on the outcome of the first play of the game and the first wager received;

determine if a first trigger event has occurred based on the outcome of the first play of the game;

cause the game piece dispenser to dispense a physical game piece if the first trigger event has occurred;

after causing the game piece dispenser to dispense the physical game piece, receive a second wager on a second, subsequent play of the game;

determine if a second trigger event has occurred for the second play of the game;

if the second trigger event has occurred for the second play of the game, receive at least one identifier associated with the dispensed physical game piece resulting from the first play of the game via the identification input device;

determine a second payout according to the at least one received identifier; and cause the at least one display unit to generate a reveal pattern based on the second trigger event such that when the physical game piece is placed adjacent to the at least one display unit, the reveal pattern cooperates with at least one concealing image of the dispensed physical game piece to make at least one hidden image of the dispensed physical game piece visible.

13. The gaming system according to claim 12, wherein the game piece dispenser includes a printer capable of printing in a first color and a second color, the first color defining at least one hidden image on a substrate and the second color defining at least one concealing image on the substrate.

14. The gaming system according to claim 13, further comprising a game piece server, the game piece server being programmed to operate with the printer to:

determine whether to dispense a winning physical game piece or a non-winning physical game piece if the first trigger event has occurred;

control the printer to fabricate a physical game piece having at least one hidden image and at least one identifier associated with a payout greater than zero if the determination by the game piece server is to dispense the winning physical game piece; and control the printer to fabricate a physical game piece having at least one hidden image and at least one identifier associated with a payout of zero if the determination by the game piece server is to dispense the non-winning physical game piece.

15. The gaming system according to claim 13, further comprising a game piece server, the game piece server being programmed operate with the printer and the controller to:

fabricate a game piece having:

at least one hidden image, at least one concealing image disposed on the at least one hidden image which limits the visibility of the at least one hidden image, and at least one identifier;

receive the at least one identifier from the controller;

determine if the at least one physical game piece associated with the at least one identifier is a winning game piece; and provide an indication to the controller whether the at least one physical game piece associated with the at least one identifier is the winning game piece.

16. The gaming system according to claim 15, wherein the game piece server is programmed to provide an indication to the controller of a payout associated with the at least one physical game piece if the at least one physical game piece is the winning game piece.

17. The gaming system according to claim 12, wherein the game piece dispenser includes a hopper configured to receive a plurality of physical game pieces, each physical game piece having at least one hidden image and at least one concealing image disposed thereon, the at least one concealing image limiting the visibility of the at least one hidden image for each physical game piece.

18. The gaming system according to claim 12, which includes the dispensed physical game piece, the dispensed physical game piece comprising:

at least one hidden image;

at least one concealing image disposed on the at least one hidden image, the at least one concealing image limiting the visibility of the at least one hidden image; and at least one identifier.

19. The gaming system according to claim 18, wherein the at least one concealing image limits visibility of the at least one identifier.

20. The gaming system according to claim 18, wherein the dispensed physical game piece includes at least one security element.

21. The gaming machine according to claim 20, wherein the at least one security element includes at least one selected from the group consisting of: a bar code, a representation of biometric data associated with a player, and a radio frequency identification device.

22. The gaming system according to claim 18, wherein the dispensed physical game piece includes a plurality of hidden images, the at least one concealing image limiting the visibility of the plurality of hidden images.

23. The gaming system according to claim 12, wherein the identification input device includes at least one selected from the group consisting of: a touch-sensitive display, a keyboard, a keypad, a ticket reader, a card reader, a bar code scanner, an optical scanner, a magnetic scanner, and a light sensor.

24. A gaming system comprising:

at least one display device;

at least one physical game piece dispenser; and at least one processor programmed to operate with the at least one display device and the at least one physical game piece dispenser to:

(a) randomly determine if a first trigger event occurs for a first play of a game, (b) if the first trigger event occurs for the first play of the game:

(i) dispense a physical game piece from a plurality of physical game pieces, the physical game piece being associated with a unique identifier, and (ii) store an indication of the unique identifier indicating that the dispensed physical game piece has been dispensed, (c) randomly determine if a second trigger event occurs for a subsequent second play of the game, (d) randomly determine an award based on the unique identifier associated with the dispensed physical game piece upon an occurrence of one of: (i) the first trigger event, and (ii) the second trigger event, and (e) if the second trigger event occurs for the second play of the game:

(i) enable a player to input an indication of a physical game piece identifier associated with the dispensed physical game piece resulting from the first play of the game, (ii) compare the inputted indication of the physical game piece identifier with the stored indication of the unique identifier, and (iii) if the inputted indication of the physical game piece identifier corresponds to the unique identifier:

(A) store an indication that the inputted indication of the physical game piece identifier is associated with the physical game piece, and (B) display the award associated with the unique identifier.

25. The gaming system of claim 24, wherein the game is a wagering game.

26. The gaming system of claim 24, wherein the at least one processor is programmed to generate each of a first game outcome for the first play of the game and a second game outcome for the second play of the game from a plurality of game outcomes, wherein the first trigger event occurs based on the first game outcome, wherein the second trigger event occurs based on the second game outcome, and wherein the first game outcome and the second game outcome are different game outcomes.

27. The gaming system of claim 24, which includes at least one game piece identifier reader, wherein the unique identifier is readable by the at least one game piece identifier reader, and wherein the at least one processor is programmed operate with the at least one game piece identifier reader to enable the player to input the indication of the physical game piece identifier by inserting the physical game piece in the game piece identifier reader.

28. The gaming system of claim 24, wherein the unique identifier includes a plurality of printed characters, and wherein the at least one processor is programmed to enable the player to input the indication of the physical game piece identifier by inputting the printed characters using a keypad.

29. The gaming system of claim 24, wherein the at least one processor is programmed to store a plurality of indications of a plurality of unique identifiers, and wherein, if the second trigger event occurs for the second play of the game, the at least one processor is programmed to compare the inputted indication of the physical game piece identifier with each of the stored indications of each of the unique identifiers.

30. The gaming system of claim 24, wherein the first play of the game is generated by a first processor and wherein the second play of the game is generated by a second, different processor.

31. The gaming system of claim 24, wherein the physical game piece includes at least one hidden image and one concealing image, and wherein, if the second trigger event occurs, the at least one processor is programmed to operate with the at least one display device to display an indication to the player, the indication instructing the player to reveal the hidden image.

32. The gaming system of claim 31, wherein the concealing image includes a revealing material, and wherein the indication includes instructions to the player to remove the revealing material.

33. The gaming system of claim 31, wherein the concealing image includes a perforated flap, and wherein the indication includes instructions to the player tear the perforated flap.

34. The gaming system of claim 31, wherein the concealing image includes colored ink disposed on a translucent substrate, and wherein the indication includes a displayed image configured to cooperate with the colored ink to reveal the hidden image.

35. A gaming system comprising:

at least one display device;

at least one physical game piece dispenser; and at least one processor programmed to operate with the at least one display device and the at least one physical game piece dispenser to:

(a) randomly determine if a first trigger event occurs for a first play of a game, (b) if the first trigger event occurs for the first play of the game:

(i) dispense a plurality of physical game pieces, each of the physical game pieces being associated with a different unique identifier, and (ii) for each of the dispensed physical game pieces, store an indication the unique identifier indicating that said physical game piece has been dispensed, (c) randomly determine if a second trigger event occurs for a subsequent second play of the game, and (d) if the second trigger event occurs for the second play of the game:

(i) enable a player to select one of the plurality of dispensed physical game pieces, (ii) receive an input indicating a selected game piece identifier associated with the selected game piece resulting from the first play of the game, (iii) compare the selected game piece identifier with the stored indications of the unique identifiers of the plurality of dispensed physical game pieces, and (iv) if the selected game piece identifier corresponds to the stored indication of the unique identifier of any of the dispensed physical game pieces, display the award associated with the corresponding unique identifier based on the selected physical game piece.

36. The gaming system of claim 35, wherein the game is a wagering game.

37. The gaming system of claim 35, wherein the at least one processor is programmed to randomly generate a first game outcome for the first play of the game and a second game outcome for the second play of the game from a plurality of game outcomes, wherein the first trigger event occurs based on the first game outcome, wherein the second trigger event occurs based on the second game outcome, and wherein the first game outcome and the second game outcome are different game outcomes.

38. The gaming system of claim 35, which includes a game piece identifier reader, wherein the unique identifier of each of the plurality of physical game pieces is readable by the game piece identifier reader, and wherein the at least one processor is programmed operate with the game piece identifier reader to receive the input indicating the selected game piece identifier from the selected physical game piece based on the player inserting the selected physical game piece in the game piece identifier reader.

39. The gaming system of claim 35, wherein the unique identifier of each of the plurality of physical game pieces includes a plurality of alpha-numeric characters, and wherein the at least one processor is programmed to operate with at least one alpha-numeric input device to receive the input indicating the selected game piece identifier from the selected physical game piece by enabling the player to input the alpha-numeric characters using the alpha-numeric input device.

40. The gaming system of claim 35, wherein the first game outcome is generated by a first processor and wherein the second game outcome is generated by a second, different processor.

41. The gaming system of claim 35, wherein each of the plurality of physical game pieces includes at least one hidden image and at least one concealing image, and wherein, if the second trigger event occurs for the second play of the game, the at least one processor is programmed to operate with the at least one display device to display instructions to the player to reveal the hidden image for the selected game piece.

42. The gaming system of claim 41, wherein the concealing image includes a revealing material, and wherein the indication includes instructions to remove the revealing material.

43. The gaming system of claim 41, wherein the concealing image includes a perforated flap, and wherein the indication includes instructions to tear off the perforated flap.

44. The gaming system of claim 41, wherein the concealing image includes colored ink disposed on a translucent substrate, and wherein the indication includes a displayed image configured to cooperate with the colored ink to reveal the hidden image.

* * * * *

UNITED STATES PATENT AND TRADEMARK OFFICE

CERTIFICATE OF CORRECTION

PATENT NO. : 7,597,619 B2
APPLICATION NO. : 10/895521
DATED : October 6, 2009
INVENTOR(S) : Crivelli et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1300 days.

Signed and Sealed this

Twenty-eighth Day of September, 2010

David J. Kappos

*Director of the United States Patent and Trademark Office*